United States Patent
Kim et al.

(10) Patent No.: US 12,481,325 B2
(45) Date of Patent: Nov. 25, 2025

(54) METHOD OF ADJUSTING SIZE OF EXPOSED AREA OF FLEXIBLE DISPLAY AND ELECTRONIC DEVICE PERFORMING THE METHOD

(71) Applicant: SAMSUNG ELECTRONICS CO., LTD., Suwon-si (KR)

(72) Inventors: Moonjeong Kim, Suwon-si (KR); Yangwook Kim, Suwon-si (KR); Gyeongtae Park, Suwon-si (KR); Jookwan Lee, Suwon-si (KR); Myunghoon Kwak, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 18/082,062

(22) Filed: Dec. 15, 2022

(65) Prior Publication Data

US 2023/0141581 A1 May 11, 2023

Related U.S. Application Data

(63) Continuation of application No. PCT/KR2022/014145, filed on Sep. 22, 2022.

(30) Foreign Application Priority Data

Nov. 10, 2021 (KR) .................. 10-2021-0153726
Jan. 25, 2022 (KR) .................. 10-2022-0010943

(51) Int. Cl.
*H04M 1/02* (2006.01)
*G06F 1/16* (2006.01)
*G06F 3/0484* (2022.01)

(52) U.S. Cl.
CPC .......... *G06F 1/1652* (2013.01); *G06F 1/1677* (2013.01); *G06F 1/1679* (2013.01); *G06F 3/0484* (2013.01)

(58) Field of Classification Search
CPC .... G06F 1/1652; G06F 1/1677; G06F 1/1679; G06F 3/0484; G06F 3/04847; G06F 1/16;
(Continued)

(56) References Cited

U.S. PATENT DOCUMENTS 9,424,790 B2    8/2016   Cho et al.
2011/0117971 A1* 5/2011   Kim .................. G06F 1/1647
                                               455/566
(Continued)

FOREIGN PATENT DOCUMENTS

JP         6577064       9/2019
JP       2020-098595     6/2020
(Continued)

OTHER PUBLICATIONS

IP.com search history (Year: 2025).*
(Continued)

*Primary Examiner* — Moustapha Diaby
(74) *Attorney, Agent, or Firm* — Nixon & Vanderhye P.C.

(57) ABSTRACT

An electronic device may output, on at least a portion of a flexible display, an affordance for adjusting a size of an exposed area of a flexible display, receive information about a target size based on the affordance, and control the flexible display to have the size of the exposed size correspond to the target size.

19 Claims, 27 Drawing Sheets

(58) Field of Classification Search
CPC .... G06F 1/1624; G06F 1/3212; G06F 1/3265; G06F 3/04817; G06F 3/0482; G06F 3/0486; G06F 3/04886; G06F 3/14; G06F 2203/04803; G06T 11/00
USPC ...................................................... 455/575.4
See application file for complete search history.

(56) References Cited

U.S. PATENT DOCUMENTS

| | | | |
|---|---|---|---|
| 2021/0201709 | A1 | 7/2021 | Lee et al. |
| 2022/0329687 | A1* | 10/2022 | Kim .................. H04M 1/0268 |
| 2022/0385750 | A1* | 12/2022 | Kim .................. H04M 1/0235 |

FOREIGN PATENT DOCUMENTS

| KR | 10-0981877 B1 | 9/2010 |
|---|---|---|
| KR | 10-2013-0133460 A | 12/2013 |
| KR | 10-1600620 | 3/2016 |
| KR | 10-2105958 | 4/2020 |
| KR | 10-2021-0002617 | 1/2021 |
| KR | 10-2222338 | 3/2021 |
| KR | 10-2254597 | 5/2021 |
| KR | 10-2256042 B1 | 5/2021 |
| WO | WO 2021/095925 A1 | 5/2020 |
| WO | WO 2021/045276 A1 | 3/2021 |
| WO | WO 2021/107225 A1 | 6/2021 |
| WO | WO 2021/137319 A1 | 7/2021 |

OTHER PUBLICATIONS

Extended European Search Report dated Oct. 8, 2024 for EP Application No. 22893014.5.
PCT International Search Report dated Dec. 20, 2022 for PCT Application No. PCT/KR2022/014145.

* cited by examiner

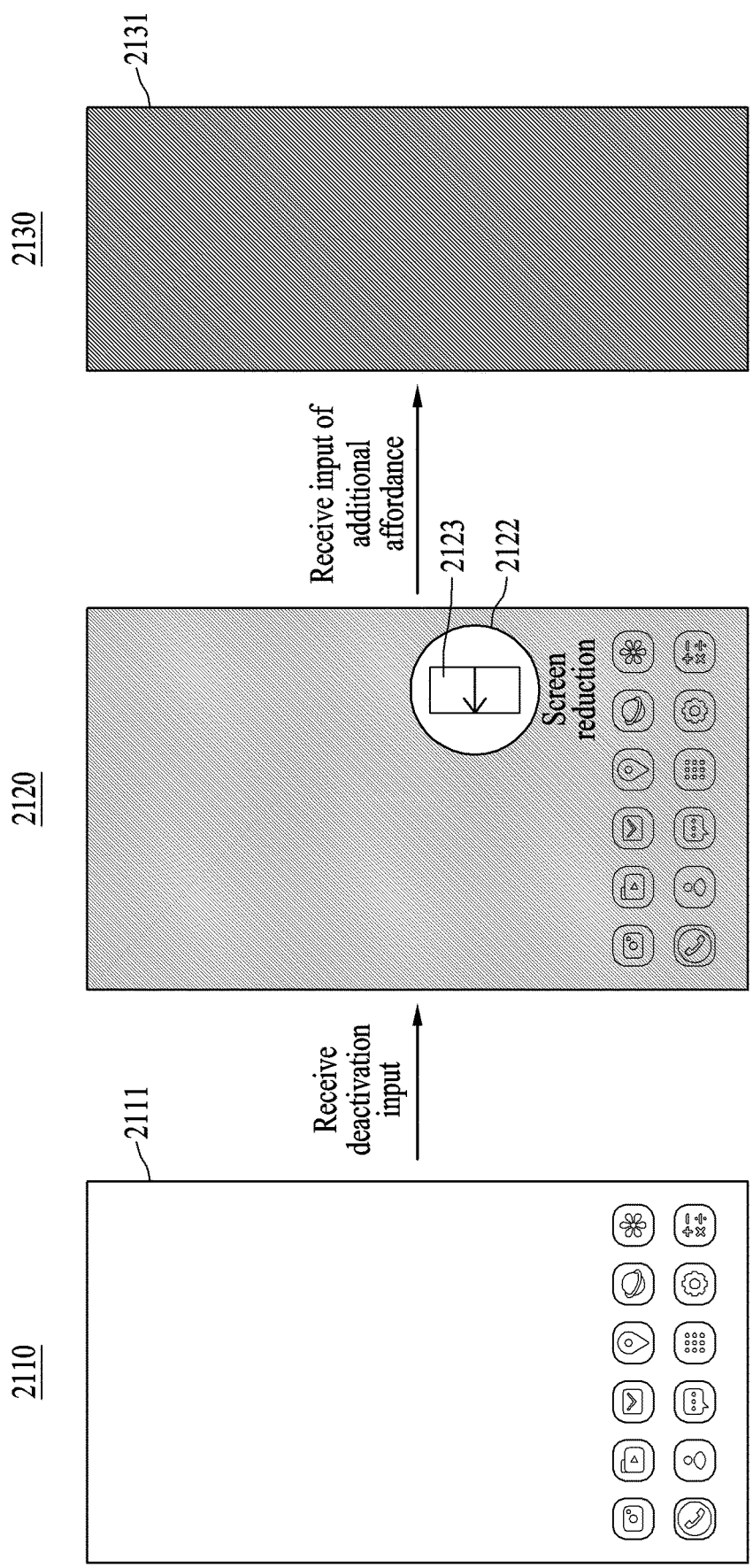

METHOD OF ADJUSTING SIZE OF EXPOSED AREA OF FLEXIBLE DISPLAY AND ELECTRONIC DEVICE PERFORMING THE METHOD

CROSS-REFERENCE TO RELATED APPLICATIONS

This application is a national stage application of International Application No. PCT/KR2022/014145 designating the United States, filed on Sep. 22, 2022, in the Korean Intellectual Property Receiving Office and claiming priority to Korean Patent Application No. 10-2021-0153726, filed on Nov. 10, 2021, in the Korean Intellectual Property Office, and Korean Patent Application No. 10-2022-0010943, filed on Jan. 25, 2022, in the Korean Intellectual Property Office, the disclosures of which are all hereby incorporated by reference herein in their entireties.

BACKGROUND

1. Field

Various example embodiments relate to technology for adjusting the size of an exposed area of a flexible display of an electronic device.

2. Description of Related Art

The development of display technology introduces various expandable displays. For example, such an expandable display may be implemented through a flexible display. The flexible display may be flexible as it uses a plastic film instead of glass. The flexible display is not only thin and light, but also resistant to shock and bendable so that the flexible display may be manufactured in various shapes. Such a flexible display may be used in an industrial field in which a glass substrate-based display has been restrictively or hardly used.

SUMMARY

A degree of expanding/reducing an area exposed externally on a flexible display may vary depending on the size of each stage. In addition, when a user uses an activated electronic device including a flexible display, there may be two cases: a) where the user intends to use the electronic device as it is, without expanding/reducing the size of an exposed area of the flexible display and b) where the user intends to use the electronic device with the flexible display expanded/reduced according to the purpose of use of the electronic device. When the user intends to expand/reduce the size of the exposed area of the flexible display according to the purpose of use of the electronic device, the user may desire to quickly adjust the size of the exposed area of the flexible display when the electronic device is activated.

An example embodiment may provide an electronic device that outputs an affordance for adjusting a size of an exposed area of a flexible display.

According to an example embodiment, an affordance may include, but not be limited to, a graphic object, a user interface, an icon, a text object, a window, audio output through a speaker, or vibration through a haptic module, which are shown on a display to induce the user's action (e.g., control of an electronic device or selection for options visually or audibly output through the electronic device).

However, the technical aspects are not limited to the aforementioned aspects, and other technical aspects may be present.

According to an example embodiment, an electronic device may include a driving module comprising a motor and/or circuitry, a flexible display having a variable size of an exposed area viewable externally on a side (e.g., one side) as at least a portion of the flexible display is drawn out from an inside of the electronic device by driving of the driving module, at least one memory configured to store executable instructions, and a processor configured to be operatively connected, directly or indirectly, to the driving module, the flexible display, and the at least one memory and control the electronic device. The processor may be configured by executing the instructions to identify a first size of the exposed area, output, on at least a portion of the exposed area, an affordance including at least one selectable user interface (UI) element configured to change a size of the exposed area based on the identified first size, and when a UI element is selected from among the at least one UI element, control the driving module to change the size of the exposed area from the first size to a second size substantially corresponding to a selected UI element.

According to an example embodiment, a method performed by an electronic may include outputting, on at least a portion of an exposed area, an affordance for adjust a size of the exposed area when a flexible display has a variable size of an exposed area viewed externally on one side as at least a portion of the flexible display is drawn out from an inside of the electronic device and the flexible display is activated, identifying a target size on the exposed area, based on an input to the affordance, controlling the driving module configured to move the flexible display to have the size of the exposed area correspond to the target size.

According to an example embodiment, an electronic device may include a flexible display having a variable size of an exposed area viewed externally on one side as at least a portion of the flexible display is drawn out from an inside of the electronic device, at least one memory configured to store executable instructions, and at least one processor configured to control the electronic device. The processor may be configured to output, on at least a portion of an exposed area, an affordance for adjusting a size of the exposed area when an input of deactivating the flexible display is received, receive information on a second target size of a second target based on an additional affordance, control the flexible display to have the size of the exposed area correspond to the second target size, and deactivate the flexible display.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 21 illustrates a method of outputting an additional affordance when an input of deactivating a flexible display is received and controlling a flexible display based on an additional affordance, according to an example embodiment.

DETAILED DESCRIPTION

Hereinafter, various embodiments of the present disclosure will be described with reference to the accompanying drawings. However, this is not intended to limit the present disclosure to specific embodiments, and it should be understood that various modifications, equivalents, and/or alternatives of the embodiments of the present disclosure are included.

Figure 1:
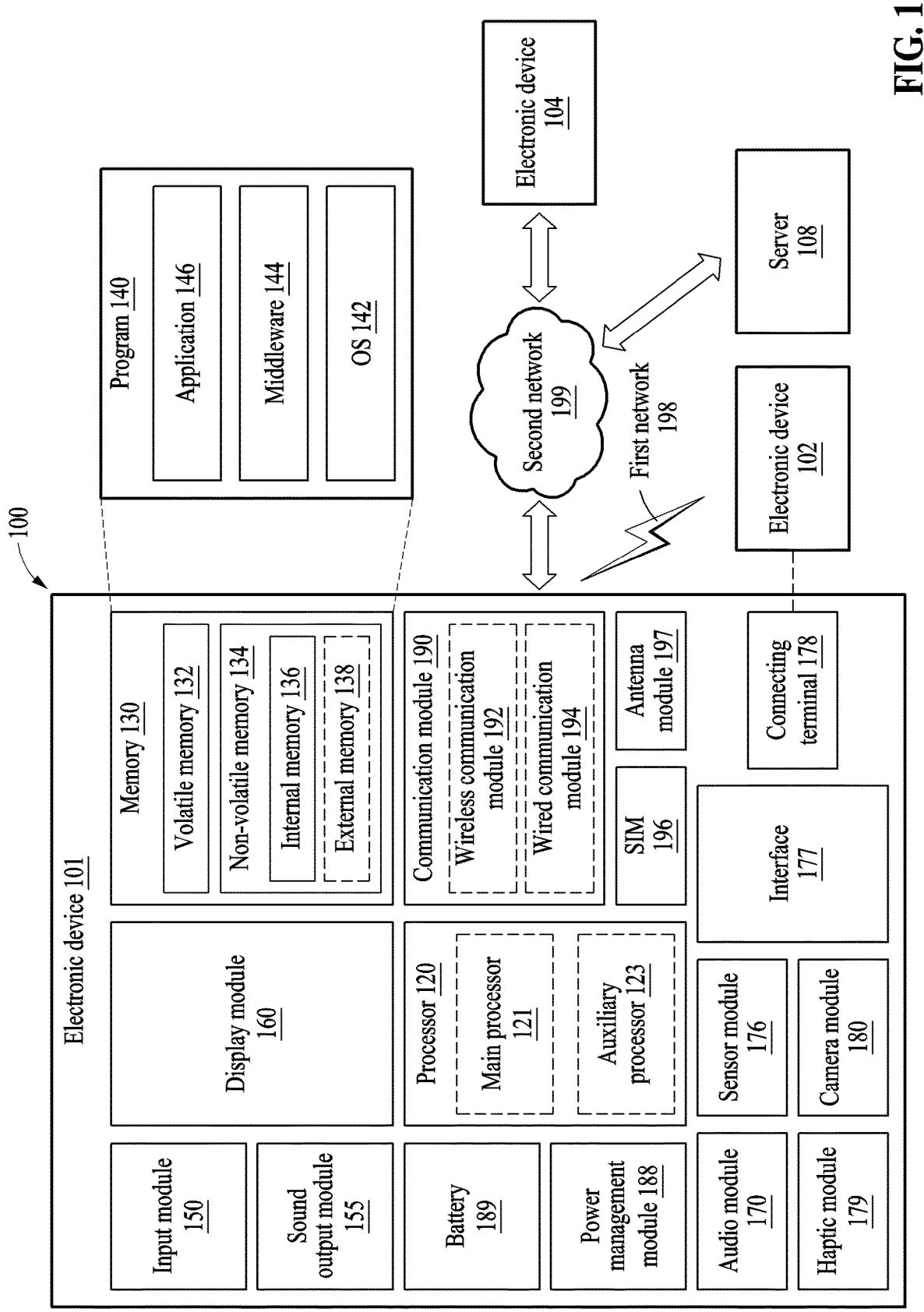
FIG. 1 is a block diagram illustrating an electronic device in a network environment, according to an example embodiment.

FIG. 1 is a block diagram illustrating an electronic device in a network environment, according to an example embodiment.

FIG. 1 is a block diagram illustrating an electronic device 101 in a network environment 100 according to embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. according to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134 (which may include internal memory 136 and/or external memory 138). According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjoint with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. according to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. according to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an example embodiment, the external electronic device (e.g., the electronic device 104) may include an Internet-of-things (IoT) device. The server 108 may be an intelligent server using machine learning and/or a neural network. according to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
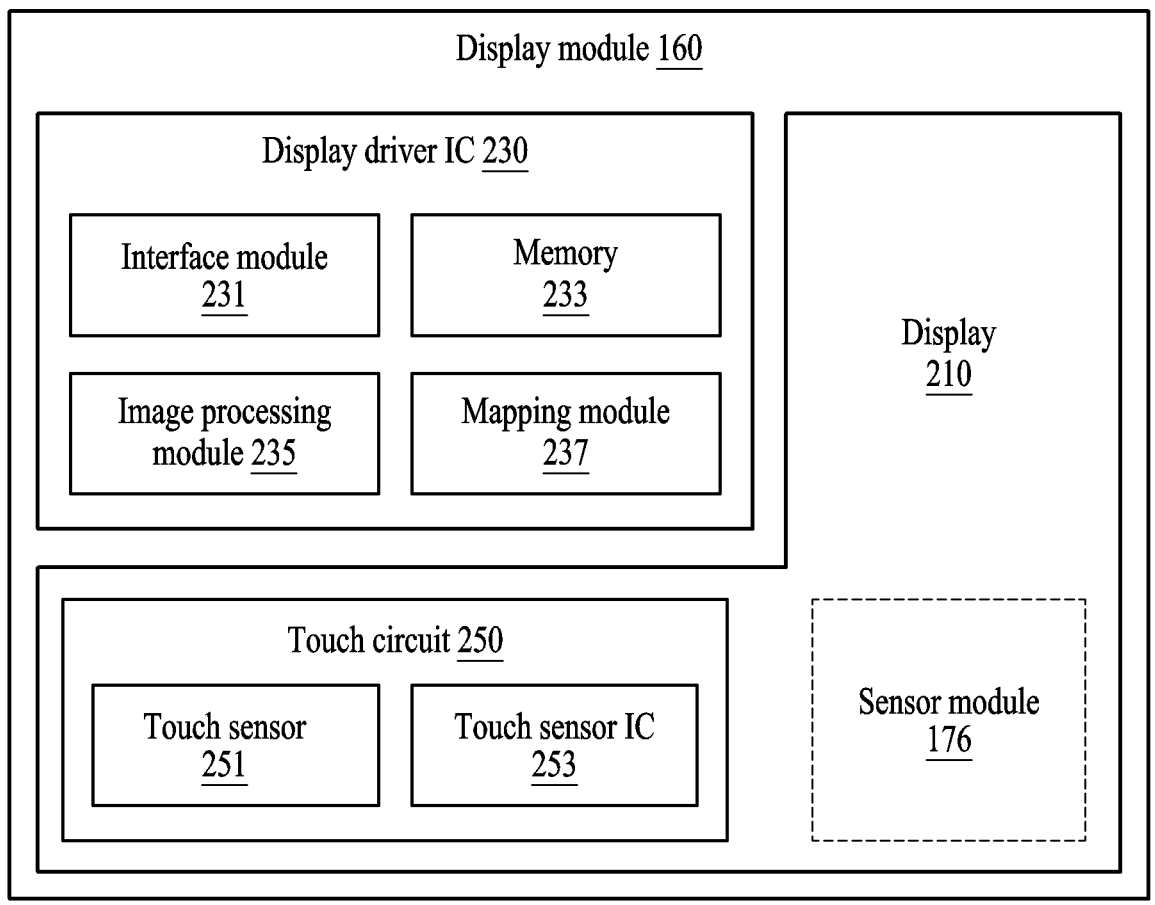
FIG. 2 is a block diagram of a display module according to an example embodiment.

FIG. 2 is a block diagram of a display module according to an example embodiment.

Referring to FIG. 2, a display module 160 described with reference to FIG. 1 may include a display 210 and a display driver IC (DDI) 230 configured to control the display 210.

The DDI 230 may include an interface module 231, a memory 233 (e.g., a buffer memory), an image processing module 235, or a mapping module 237. The DDI 230 may receive, for example, image data or image information including an image control signal corresponding to a command for controlling the image data from other components of the electronic device 101 through the interface module 231. According to an example embodiment, image information may be received by the processor 120 (e.g., the main processor 121 (e.g., an application processor) or the auxiliary processor 123 (e.g., a graphics processing device) operated independently from a function of the main processor 121). The DDI 230 may communicate with a touch circuit 250 or a sensor module 176 through the interface module 231. Also, the DDI 230 may store at least some of the received image information in the memory 233, for example, in frame units.

The image processing module 235 may, for example, pre-process or post-process (e.g., adjusting resolution, brightness, or size) at least some of the image data based on at least a characteristic of the image data or a characteristic of the display 210.

The mapping module 237 may generate a voltage value or a current value corresponding to the image data pre-processed or post-processed by the image processing module 235. According to an example embodiment, generating the voltage value or the current value may be, for example, performed based on at least some of a property of pixels of the display 210 (e.g., the arrangement of pixels (an RGB-stripe structure or pentile structure), or the size of each sub-pixel). At least some pixels of the display 210 may, for example, be driven at least partially based on the voltage value or the current value, so that visual information (e.g., a text, image, or icon) corresponding to the image data may be presented on the display 210.

According to an example embodiment, the display module 160 may further include the touch circuit 250. The touch circuit 250 may include a touch sensor 251 and a touch sensor IC 253 configured to control the touch sensor 251. The touch sensor IC 253 may, for example, control the touch sensor 251 to sense a touch input or a hovering input of a specific position of the display 210. For example, the touch sensor IC 253 may measure a change in a signal for a specific position of the display 210 (e.g., a voltage, a light amount, resistance, or an electric charge amount) and thus sense a touch input or a hovering input. The touch sensor IC 253 may provide information on the sensed touch input or hovering input (e.g., a position, an area, a pressure, or time) to the processor 120. According to an example embodiment, at least a part of the touch circuit 250 (e.g., the touch sensor IC 253) may be included as a part of the display driver IC 230 or the display 210, or another component (e.g., the auxiliary processor 123) disposed outside the display module 160.

According to an example embodiment, the display module 160 may further include at least one sensor (e.g., a fingerprint sensor, an iris sensor, a pressure sensor, or an illuminance sensor) of the sensor module 176, or a control circuit for the at least one sensor. In this case, the at least one sensor or the control circuit for the at least one sensor may be embedded in a part of the display module 160 (e.g., the display 210 or the DDI 230) or a part of the touch circuit 250. For example, when the sensor module 176 embedded in the display module 160 includes a biometric sensor (e.g., a fingerprint sensor), the biometric sensor may acquire biometric information related to a touch input (e.g., a fingerprint image) through a partial area of the display 210. For example, when the sensor module 176 embedded in the display module 160 includes a pressure sensor, the pressure sensor may acquire pressure information related to a touch input on a part or the entire area of the display 210. According to an example embodiment, the touch sensor 251 or the sensor module 176 may be disposed between pixels of a pixel layer of the display 210 or above or below the pixel layer.

Figure 3A:
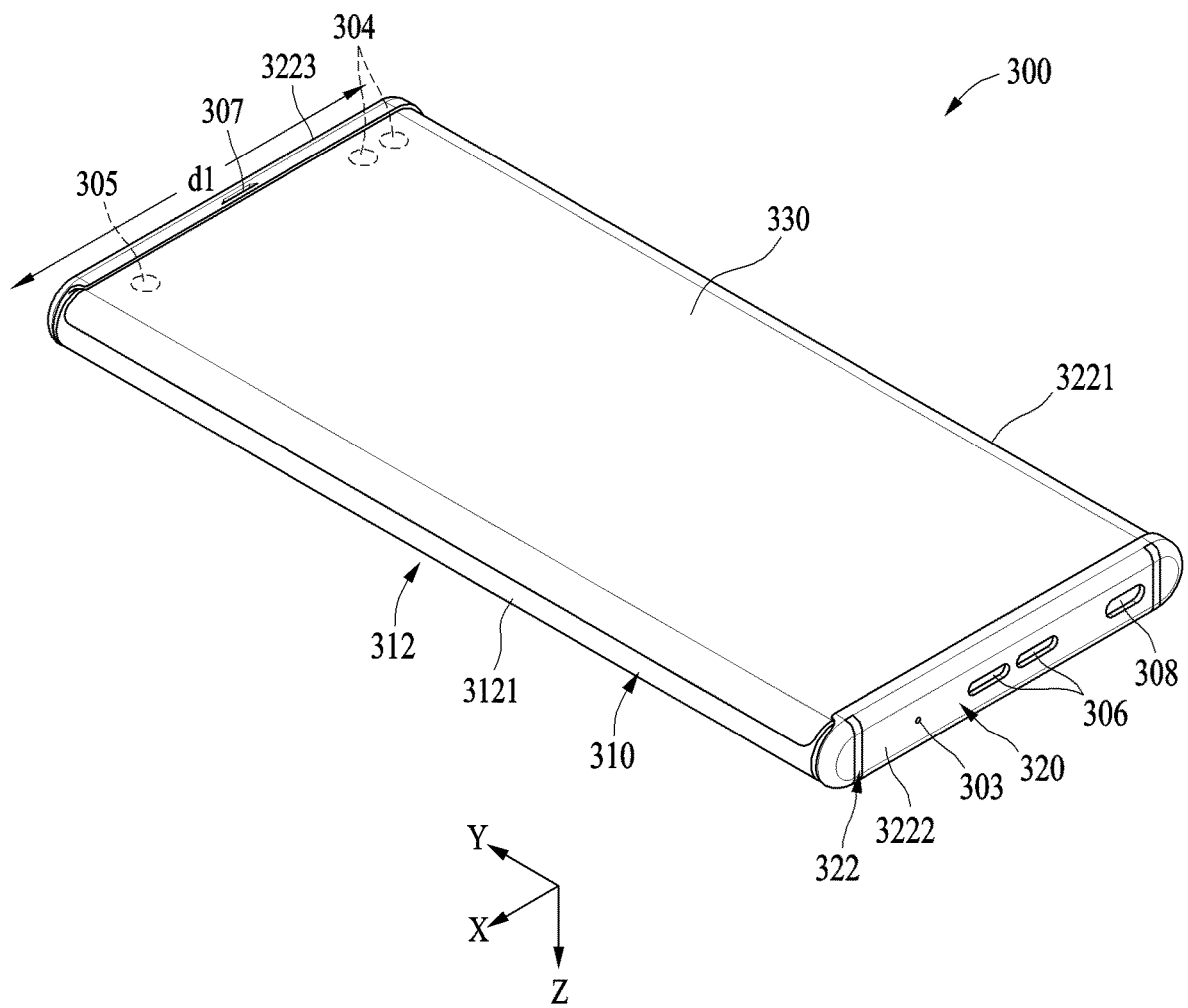
FIGS. 3A and 3B are front perspective views illustrating a reduction state and an expansion state of an electronic device including a flexible display according to various example embodiments.
Figure 3B:
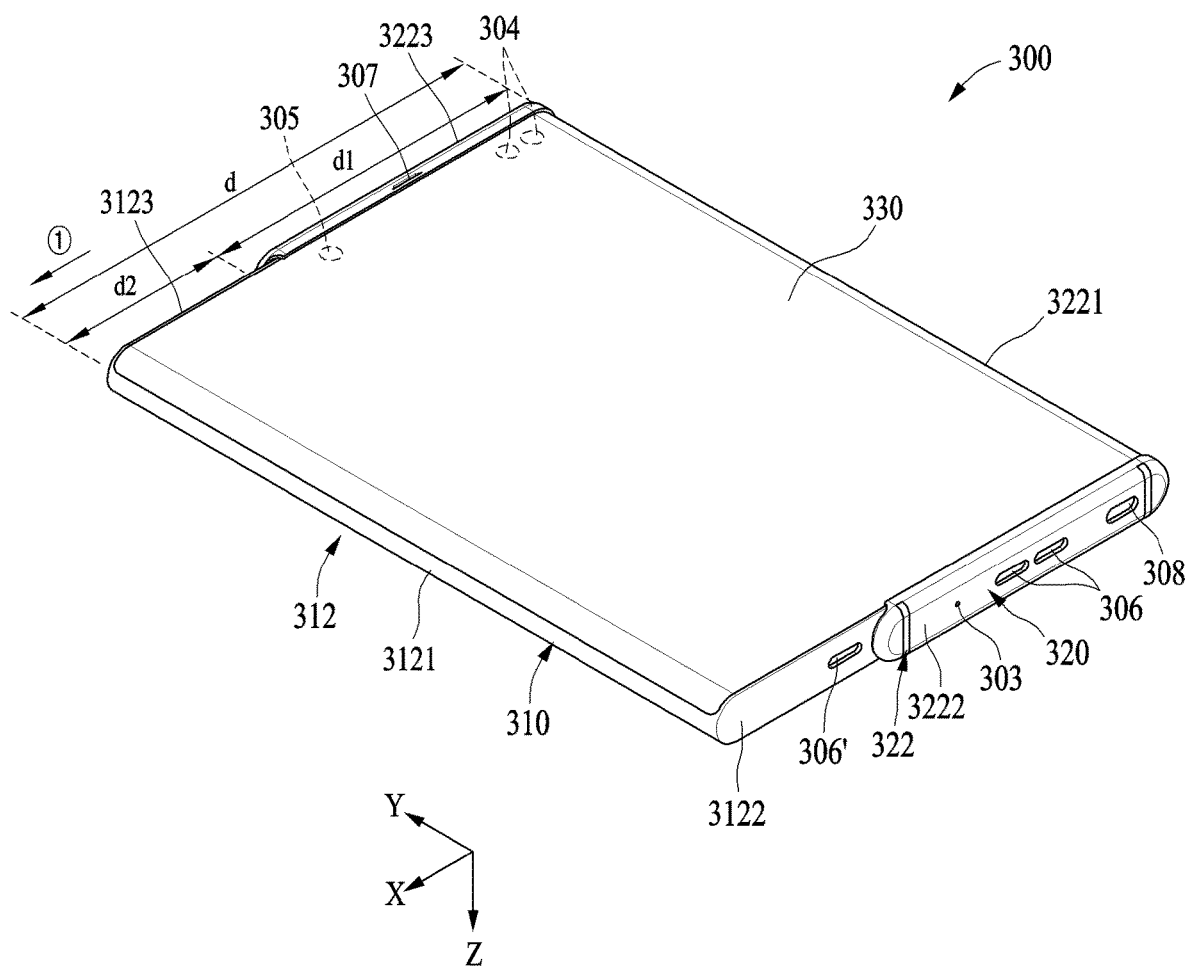

FIGS. 3A and 3B are front perspective views illustrating a reduction state and an expansion state of an electronic device including a flexible display according to various embodiments.

Figure 4A:
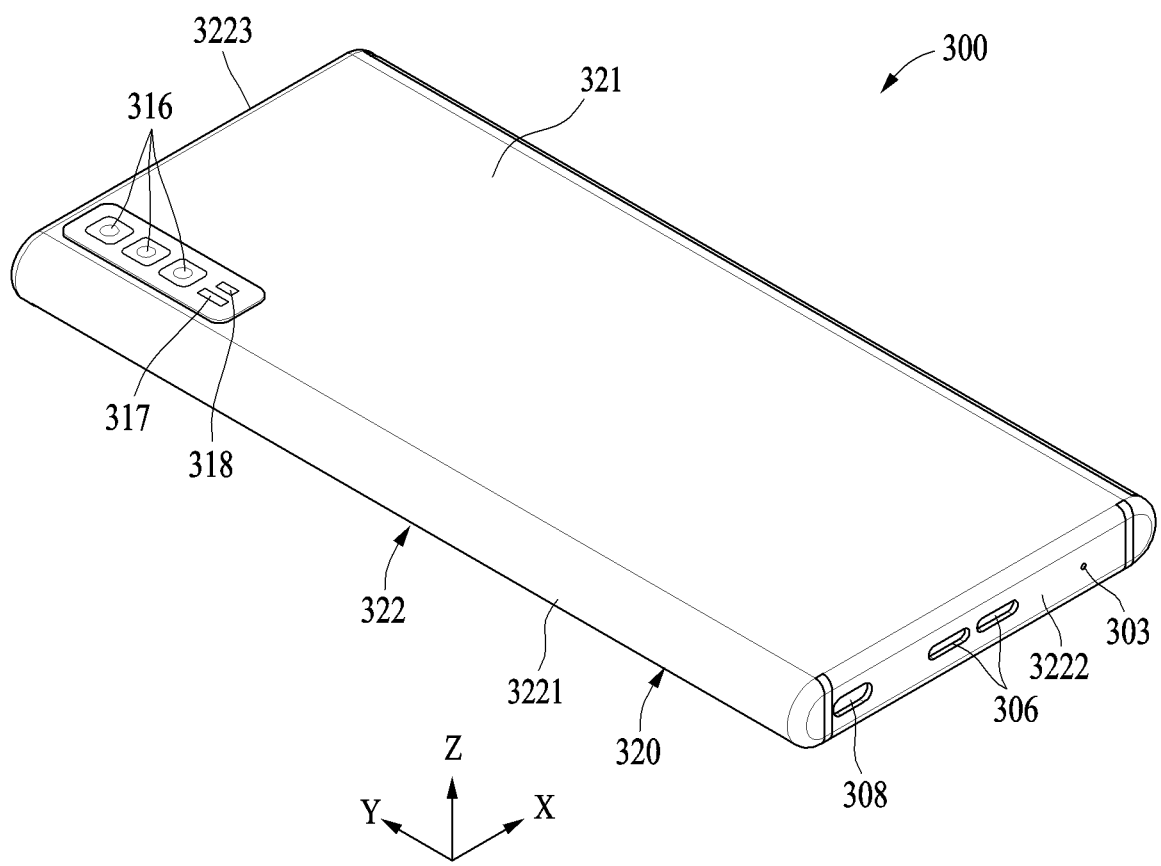
FIGS. 4A and 4B are rear perspective views illustrating a reduction state and an expansion state of an electronic device including a flexible display according to various example embodiments.
Figure 4B:
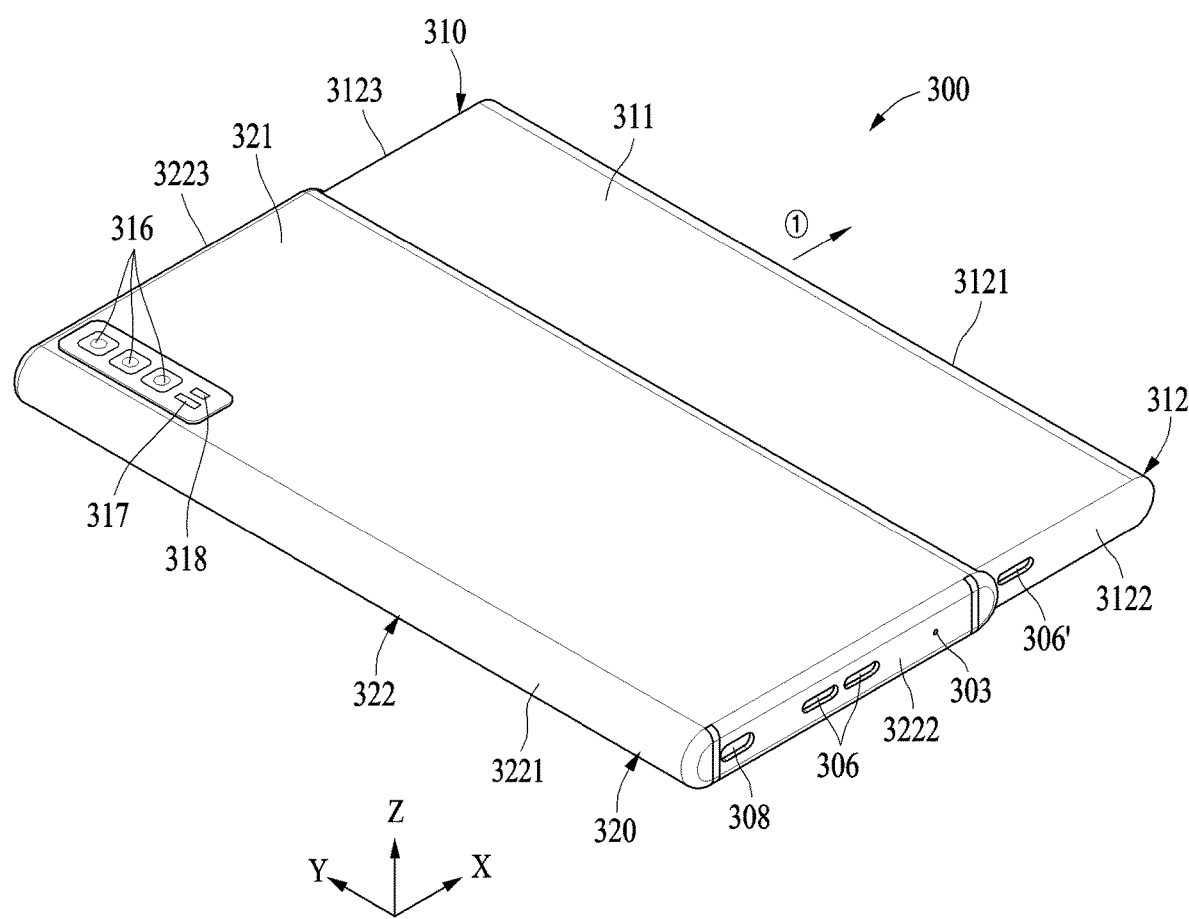

FIGS. 4A and 4B are rear perspective views illustrating a reduction state and an expansion state of an electronic device including a flexible display according to various embodiments.

An electronic device 300 of FIG. 3A may be similar to the electronic device 101 of FIG. 1, at least partially, or may further include other components than those of the electronic device 101 of FIG. 1.

Referring to FIGS. 3A to 4B, the electronic device 300 may include a first housing 310 and a second housing 320 at least partially and movably connected, directly or indirectly, to the first housing 310. According to an example embodiment, the first housing 310 may include a first plate 311 and a first side frame 312 that extends in a substantially vertical direction (e.g., the z-axis direction) along an edge of the first plate 311. According to an example embodiment, the first side frame 312 may include a first side surface 3121, a second side surface 3122 extending from one end of the first side surface 3121, and a third side surface 3123 extending from the other end of the first side surface 3121. According to an example embodiment, the first housing 310 may include a first space that is at least partially closed from the outside by the first plate 311 and the first side frame 312.

According to various embodiments, the second housing 320 may include a second plate 321 and a second side frame 322 that extends in a substantially vertical direction (e.g., the z-axis direction) along an edge of the second plate 321. According to an example embodiment, the second side frame 322 may include a fourth side surface 3221 facing away from the first side surface 3121, a fifth side surface 3222 extending from one end of the fourth side surface 3221 and at least partially coupled to the second side surface 3122, and a sixth side surface 3223 extending from the other end of the fourth side surface 3221 and at least partially coupled to the third side surface 3123. In an example embodiment, the fourth side surface 3221 may extend from a structure other than the second plate 321 and may also be coupled to the second plate 321. According to an example embodiment, the second housing 320 may include a second space that is at least partially closed from the outside by the second plate 321 and the second side frame 322. According to an example embodiment, the first plate 311 and the second plate 321 may be disposed to at least partially form the rear surface of the electronic device 300. For example, the first plate 311, the second plate 321, the first side frame 312, and the second side frame 322 may be formed of, for example, polymer, coated or colored glass, ceramic, metal (e.g., aluminum, stainless steel (STS), or magnesium), or a combination of two or more of the materials stated above.

According to various embodiments, the electronic device 300 may include a flexible display 330 disposed to be supported by the first housing 310 and the second housing 320. According to an example embodiment, the flexible display 330 may include a flat portion supported by the second housing 320, and a bendable portion extending from the flat portion and supported by the first housing 310. According to an example embodiment, the bendable portion of the flexible display 330 may be disposed in the first space of the first housing 310 and not exposed to the outside when the electronic device 300 is reduced and may be exposed to the outside to extend from the flat portion while being supported by the first housing 310 when the electronic device 300 is expanded. Accordingly, the electronic device 300 may be a rollable-type electronic device in which a display screen of the flexible display 330 is expanded in response to an expansion operation according to movement of the first housing 310 from the second housing 320.

According to various embodiments, in the electronic device 300, the first housing 310 may be at least partially inserted into the second space of the second housing 320 and may be coupled to be movable in direction ①. For example, in the reduced state, the electronic device 300 may be maintained in a state in which the first housing 310 and the second housing 320 are coupled such that a distance between the first side surface 3121 and the fourth side surface 3221 is a first distance d1. according to an example embodiment, in the expanded state, the electronic device 300 may be maintained in a state in which the first housing 310 protrudes from the second housing 320 to have a second interval distance d in which the first side surface 3121 protrudes from the fourth side surface 3221 by a predetermined distance d2. According to an example embodiment, the flexible display 330 may be supported by the first housing 310 and/or the second housing 320 such that both ends thereof have curved edges, in the expanded state.

According to various embodiments, the electronic device 300 may automatically transition between the expanded state and the reduced state by a driving unit (or a driving module) disposed in the first space and/or the second space. For example, the driving unit may include a motor. For example, a processor (e.g., the processor 120 of FIG. 1) of the electronic device 300 may be configured to control an operation of the first housing 310 by using the driving unit when an event for a transition between the open state and the closed state of the electronic device 300 is detected. In an example embodiment, the first housing 310 may manually protrude from the second housing 320 through a user's control. In this example, the first housing 310 may protrude by a desired amount of protrusion by the user, and thus, a screen of the flexible display 330 may vary to have various display areas. Accordingly, the processor (e.g., the processor 120 of FIG. 1) of the electronic device 300 may display an object in various ways in response to a display area corresponding to a predetermined amount of protrusion of the first housing 310 and may control execution of an application program. Each "processor" herein comprises processing circuitry.

According to various embodiments, the electronic device 300 may include at least one of an input device (e.g., the input module 150 of FIG. 1) and sound output devices (e.g., the sound output module 155 of FIG. 1), sensor modules (e.g., the sensor module 176 of FIG. 1), camera modules (e.g., the camera module 180 of FIG. 1), a connector port 308 (e.g., the connecting terminal 178 of FIG. 1), a key input device (not shown), or an indicator (not shown). In an example embodiment, at least one of the components described above of the electronic device 300 may be omitted, or the electronic device 300 may further include other components.

According to an example embodiment, the input device may include a microphone 303. In an example embodiment, the input device may include a plurality of microphones 303 arranged to sense a direction of sound. The sound output devices may include speakers 306 (including 306') and 307. The speakers 306 and 307 may include an external speaker 306 and a phone call receiver 307. In an example embodiment, when an external speaker 306 is disposed in the first housing 310, sound may be output through a speaker hole formed in the second housing 320 in the reduced state. According to an example embodiment, the microphone 303 or the connector port 308 may also be formed to have substantially the same configuration. In an example embodiment, the sound output devices may include a speaker (e.g., a piezo speaker) that operates without a separate speaker hole.

According to an example embodiment, the sensor modules may generate an electrical signal or a data value corresponding to an internal operating state of the electronic device 300 or an external environmental state. The sensor modules may include, for example, a first sensor module 304 (e.g., a proximity sensor or an illuminance sensor) disposed on the front surface of the second housing 320 and/or a second sensor module 317 (e.g., a heart rate monitoring (HRM) sensor) disposed on the rear surface of the second housing 320. According to an example embodiment, the first sensor module 304 may be disposed below the flexible display 330 in the second housing 320. According to an example embodiment, the first sensor module 304 may further include at least one of a proximity sensor, the illuminance sensor, a time of flight (ToF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

According to an example embodiment, the camera devices may include a first camera device 305 disposed on the front surface of the second housing 320 of the electronic device 300. And a second camera 316 disposed on the rear surface of the second housing 320. According to an example embodiment, the electronic device 300 may include a flash 318 near the second camera device 316. According to an example embodiment, the camera devices may include one or more lenses, an image sensor, and/or an image signal processor (ISP). According to an example embodiment, the first camera device 305 may be disposed under the flexible display 330 and may be configured to capture an object through a portion of an active area of the flexible display 330. For example, the first camera device 305 may not be visually exposed in an active area of the flexible display 330 and may include a hidden under display camera (UDC). According to an example embodiment, the flash 318 may include, for example, a light-emitting diode (LED) or a xenon lamp. In some embodiments, two or more lenses (e.g., a wide-angle lens and a telephoto lens) and image sensors may be disposed on one surface of the electronic device 300.

According to an example embodiment, the electronic device 300 may include at least one antenna (not shown). According to an example embodiment, the at least one antenna may wirelessly communicate with an external electronic device (e.g., the electronic device 104 of FIG. 1), or may wirelessly transmit and receive power required for charging the electronic device 300. According to an example embodiment, the antenna may include a legacy antenna, a mmWave antenna, a near field communication (NFC) antenna, a wireless charging antenna, and/or a magnetic secure transmission (MST) antenna. In an example embodiment, an antenna structure may be formed through at least a portion of the first side frame 312 and/or the second side frame 322, which are formed of metal.

The electronic device according to an example embodiment may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the components described above may include a single entity or multiple entities, and some of the multiple entities may be separately disposed in different components. According to various embodiments, one or more of the components described above may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Each embodiment herein may be used in combination with any other embodiment described herein.

Figure 5:
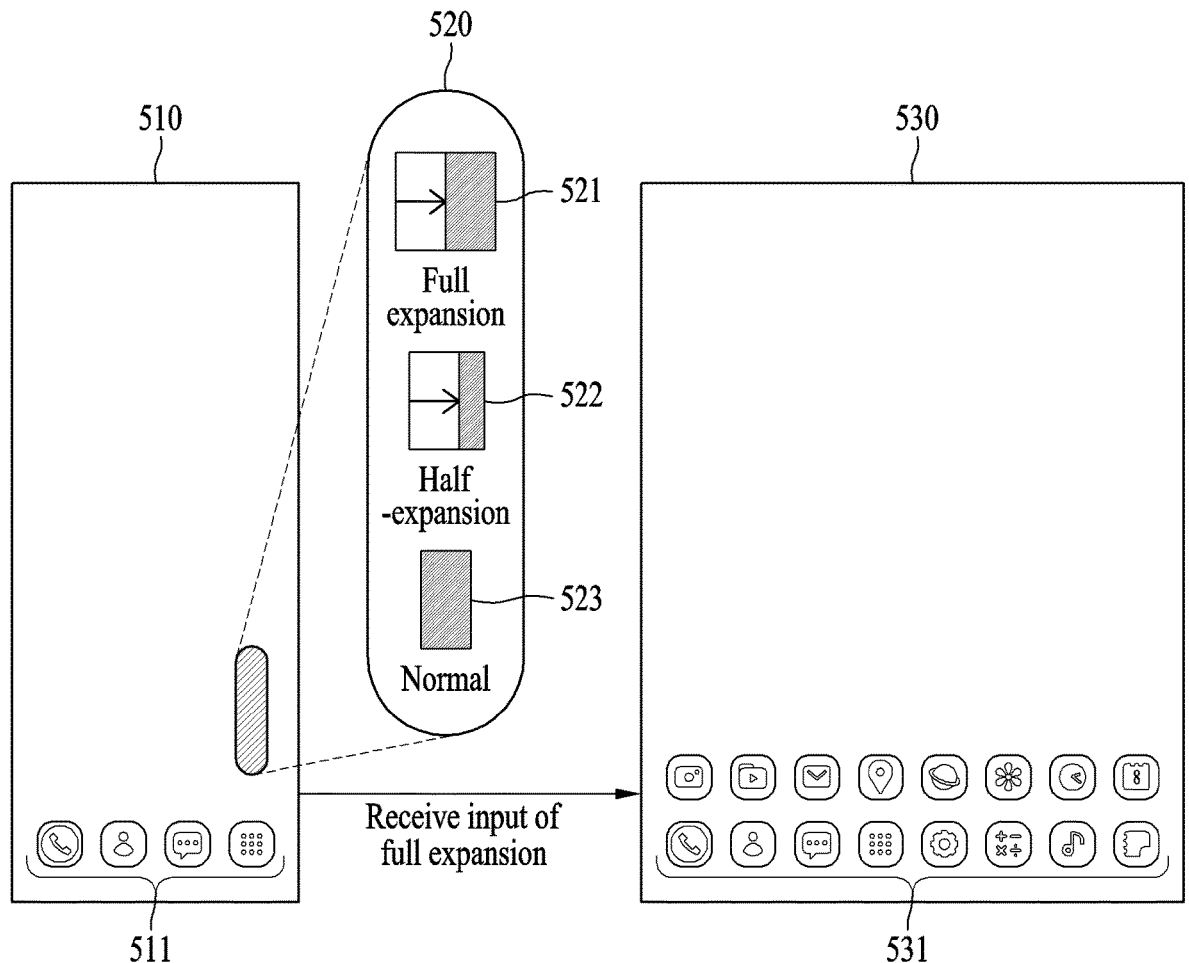
FIG. 5 illustrates an affordance including a plurality of user interface (UI) elements, according to an example embodiment.

FIG. 5 illustrates an affordance including a plurality of user interface (UI) elements, according to an example embodiment.

According to an example embodiment, an electronic device (e.g., the electronic device 101 of FIG. 1 and the electronic device 300 of FIG. 3) may include a flexible display (e.g., the flexible display 330 of FIG. 3).

The flexible display may have a variable size of an exposed area viewed externally as at least a portion of the flexible display is drawn out from the inside of the electronic device. For example, a processor (e.g., the processor 120 of FIG. 1, comprising processing circuitry) of the electronic device may control the flexible display based on a user's input or an application in operation to adjust (or change) the size of the exposed area of the flexible display.

The user may desire to quickly adjust the size of the exposed area of the flexible display when the deactivated electronic device is activated. For example, the user may maintain the flexible display in a state in which the flexible display is reduced while the user is carrying the electronic device but not using the electronic device (e.g., in an inactive state) and maintain the flexible display in a state in which the flexible display is expanded while the user is using the electronic device (e.g., in an active state). Accordingly, the user may desire to quickly adjust the size of an exposed area of the flexible display when the electronic device changes from an inactive state to an active state.

According to an example embodiment, the electronic device may output an affordance which may adjust the size of an exposed area of the flexible display when the electronic device is activated and adjust the size of the exposed area based on the output affordance, thus satisfying the user's need for changing the size of the exposed area of the flexible display quickly.

Herein, an affordance may be, for example, a visual representation indicating guidance and performance of changing the size of an exposed area of the flexible display viewed from outside. For example, when the affordance for changing the size of the exposed area of the flexible display is selected by a user's input (e.g., a touch input or a voice input), the affordance may be an object triggering a change in the size of a screen portion viewed on one side of a display screen of the electronic device. For example, the affordance for changing the size of the exposed area of the flexible display may include an expansion affordance indicating that a screen portion viewed is expandable when the size of the screen portion currently viewed is expandable. For example, the affordance for changing the size of the exposed area of the flexible display may include a reduction affordance indicating that a screen portion viewed is reducible when the size of the screen portion currently viewed is reducible. For example, the affordance for changing the size of the exposed area of the flexible display may include both the expansion affordance and the reduction affordance. Also, the affordance for changing the size may include the amount of a predicted change in size.

As an example, the electronic device may perform at least one of an output of a graphic representation indicating a scheduled amount of change determined by a pointing input as an affordance for changing the size of the exposed area of the flexible display, an output of a graphic representation indicating a remaining amount of change while the size of the screen portion viewed is being changed, and an output of a graphic representation indicating sizes additionally changeable from the size of the screen portion currently viewed.

According to an example embodiment, when the electronic device is activated, one or more app tiles 511 (e.g., icons) or a screen of an application running in the foreground may be output, based on a current size 510 of an exposed area of the flexible display. In addition, the electronic device may additionally output, on at least a portion of the exposed area, an affordance 520 for adjusting the size of the exposed area. For example, the affordance 520 may include a plurality of user interface (UI) elements 521, 522, and 523 indicating sizes. A user may select one of the plurality of UI elements 521, 522, and 523 (e.g., the UI element 521), and the electronic device may control the flexible display to adjust the size of the exposed area to a size 530 corresponding to the UI element 521, in response of the selection of the UI element 521. The exposed area adjusted to the size 530 output more app tiles 531 (e.g., icons) than the number of app tiles 511 previously output.

The user may select any one of the plurality of UI elements 521, 522, and 523 without a complex control process, so that the user may easily and quickly adjust the size of the exposed area.

Described hereinafter is a method of adjusting the size of an exposed area of a flexible display with reference to FIGS. 6 through 21.

Figure 6:
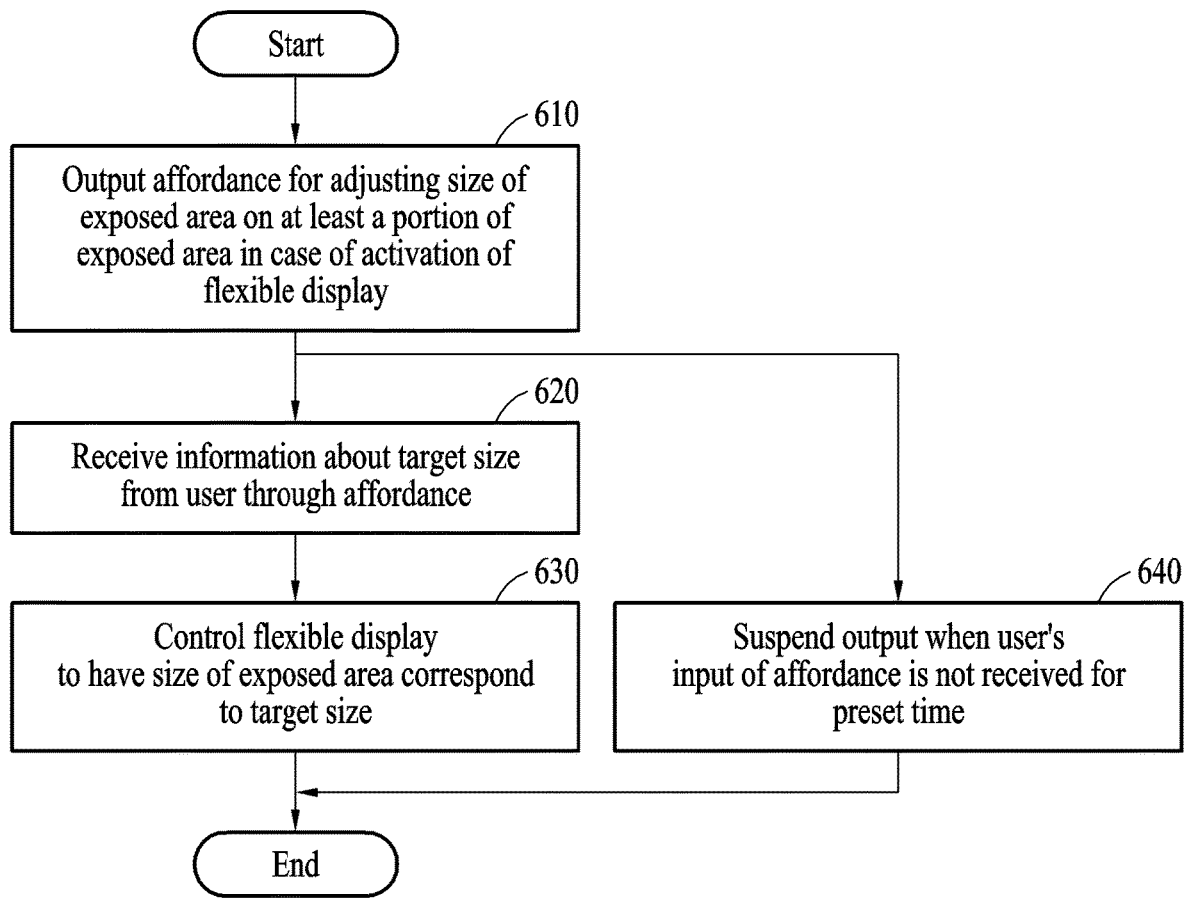
FIG. 6 is a flowchart of a method of adjusting the size of an exposed area of a flexible display, according to an example embodiment.

FIG. 6 is a flowchart of a method of adjusting the size of an exposed area of a flexible display, according to an example embodiment.

Operations 610 to 640 may be performed by an electronic device (e.g., the electronic device 101 of FIG. 1 or the electronic device 300 of FIG. 3). According to an example embodiment, the electronic device may include a processor (e.g., the processor 120 of FIG. 1) and a flexible display (e.g., the display 210 of the display module 160 or the flexible display 330 of FIG. 3). For example, the flexible display may have a variable size of an exposed area viewed outside as at least a portion of the flexible display is drawn out from the inside of the electronic device.

In operation 610, when the flexible display is activated, the processor of the electronic device may output, on at least a portion of the exposed area, an affordance for adjusting the size of an exposed area.

For example, when the flexible display that was previously off is turned on, the processor may determine that the flexible display is activated. For example, when a system is unlocked, the processor may determine that the flexible display is activated. For example, when an input for activating the deactivated electronic device is received, the processor may determine that the flexible display is activated.

According to an example embodiment, the affordance may include one or more UI elements indicating each of variable sizes of the exposed area. For example, the sizes of the exposed area may be represented as full expansion, half-expansion, or normal. Full expansion may be the maximum size, or a large size, of the exposed area, normal may be the minimum or a small size of the exposed area, and half-expansion may be the size of the exposed area between full expansion and normal. For example, the user may preset at least some of the sizes of the exposed area. The user may set a specific size between normal and full expansion, and the UI elements may indicate set sizes. The user may preset the sizes.

When the user selects a specific UI element of the affordance, the electronic device may quickly adjust the size of the exposed area to a size substantially corresponding to the specific UI element. A method of outputting an affordance including one or more UI elements is described in detail below with reference to FIGS. 7 to 13.

According to an example embodiment, the affordance may include app icons indicating applications executable on the electronic device. The user's preferable size of the exposed area for a specific application may be preset. When the user intends to execute a specific application through an app icon in the affordance, the electronic device may quickly adjust the size of the exposed area to a preset size while executing the specific application. A method of outputting the affordance including app icons is described in detail below with reference to FIGS. 14 to 16.

According to an example embodiment, the affordance may include graphic elements to induce a user's input (e.g., gesture). The electronic device may receive the user's input through the graphic elements and adjust the size of the exposed area to a size corresponding to the received user's input. A method of outputting the affordance including graphic elements to induce the user's input is described in detail below with reference to FIGS. 17, 18A, and 18B.

According to an example embodiment, although it is described that the first size of the exposed area is identified when the flexible display is activated in operation 610, the activation of the flexible display may not be a prerequisite to identifying the first size of the exposed area. For example, even when there is no activation event of the flexible display, the processor of the electronic device may identify the first size of the exposed area of the flexible display and output, on at least a portion of the exposed area, the affordance including at least one selectable UI element for changing the size of the exposed area, based on the identified first size.

In operation 620, the processor of the electronic device may receive information about a target size (e.g., a second size) from the user through the affordance.

According to an example embodiment, the user may touch (or select) a target UI element among one or more UI elements in the affordance output on the exposed area, so that the user may input information about the target size to the electronic device.

For example, the user may touch (or select) a target app icon among app icons in the affordance output on the exposed area. The processor may determine information about the target size associated with the selected target app icon.

For example, the user may perform an input (e.g., dragging and releasing) on the graphic elements of the affordance output on the exposed area so that the user may input information about the target size to the electronic device.

According to an example embodiment, the user may input a voice representing the target UI element among the one or more UI elements of the affordance output on the exposed area, so that the user may input information about the target size to the electronic device.

When information about the target size has been received from the user, the processor may suspend output of the affordance. That is, the output affordance may be removed.

In operation 630, the processor of the electronic device may control the flexible display to have the size of the exposed area correspond to the target size. For example, the processor may adjust the size of the flexible display, using the driving unit in the first space and/or the second space described with reference to FIG. 3.

According to an example embodiment, in operation 630, when one UI among the at least one UI element in the output affordance is selected, the processor of the electronic device may control the driving unit to change the size of the exposed area from a first size (e.g., the current size) to a second size (e.g., the target size) corresponding to the selected UI element.

In operation 640, when the user's input to the affordance is not performed within a preset time (e.g., operation 620 is not performed), the processor of the electronic device may suspend output of the affordance. For example, the electronic device may suspend output of the affordance so that the affordance disappears immediately or gradually.

According to an example embodiment, the preset time for the output affordance may be set differently depending on the type, form, or output state of the affordance. For example, the preset time for each affordance described with reference to the drawings (e.g., the affordance 520 of FIG. 5, an affordance 820 of FIG. 8A, an affordance 840 of FIG. 8B, an affordance 860 of FIG. 8C, an affordance 1032 of FIG. 10, an affordance 1220 of FIG. 12, an affordance 1530 of FIG. 15, an affordance 1620 of FIG. 16, an affordance 1820 of FIG. 18A, an affordance 1860 of FIG. 18B, an affordance 1910 of FIG. 19A, an affordance 1920 of FIG. 19B, an affordance 1930 of FIG. 19C, and an affordance 2122 of FIG. 21) may be different from another.

Figure 7:
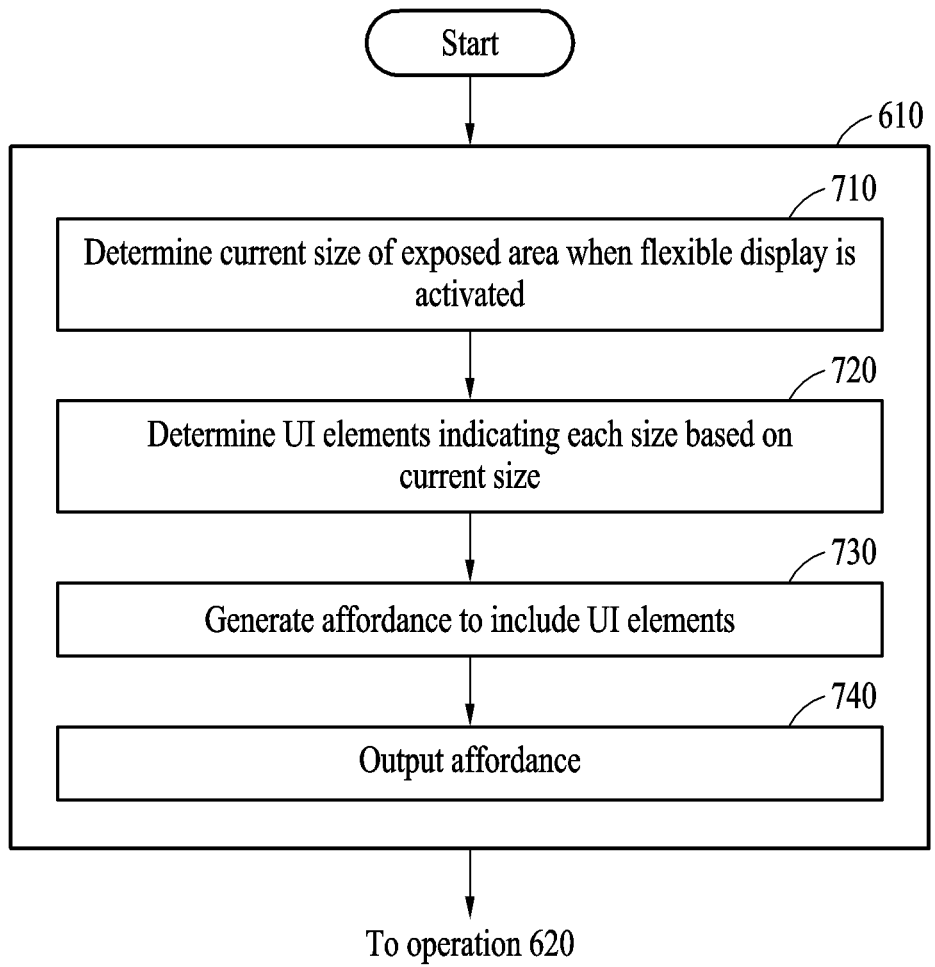
FIG. 7 is a flowchart of a method of outputting an affordance to include a plurality of UI elements, according to an example embodiment.

FIG. 7 is a flowchart of a method of outputting an affordance to include one or more UI elements, according to an example embodiment.

According to an example embodiment, operation 610 described above with reference to FIG. 6 may include operations 710 through 740 to be described hereinafter with reference to FIG. 7.

In operation 710, a processor (e.g., the processor 120 of FIG. 1) of an electronic device (e.g., the electronic device 101 of FIG. 1 or the electronic device 300 of FIG. 3) may determine (or identify) a current size (e.g., the first size) of an exposed area when a flexible display (e.g., the display 210 of the display module 160 or the flexible display 330 of FIG. 3) of the electronic device is activated.

According to an example embodiment, the current size of the exposed area may be determined to be any one of normal, half-expansion, and full-expansion. Although it has been described in an embodiment that the sizes of the exposed area are classified into normal, half-expansion, and full expansion, the type and shape of sizes of the exposed area is not limited to the described embodiment. For example, the sizes of the exposed area may be defined based on a screen ratio.

In operation 720, the processor of the electronic device may determine a plurality of UI elements representing each of the sizes, based on the current size. For example, the processor may determine one or more UI elements representing each of the one or more sizes, based on the current size.

According to an example embodiment, even if UI elements indicate the same size, a term indicating the size corresponding to the term may vary depending on the current size and the plurality of UI elements may be set to include a term indicating its corresponding size. The plurality of UI elements representing each of the sizes, based on a current size, are described in detail below with reference to FIGS. 8A to 8C.

In operation 730, the processor of the electronic device may generate an affordance to include the plurality of UI elements. For example, the arrangement of the plurality of UI elements in the affordance may vary depending on a determined current size (e.g., the current size determined in operation 710).

In operation 740, the processor of the electronic device may output the generated affordance on at least a portion of the exposed area of the flexible display. For example, the affordance may be output at a position that a user easily touches with their finger(s) or other input member. The user may predetermine the position at which the affordance is output.

Figure 8A:
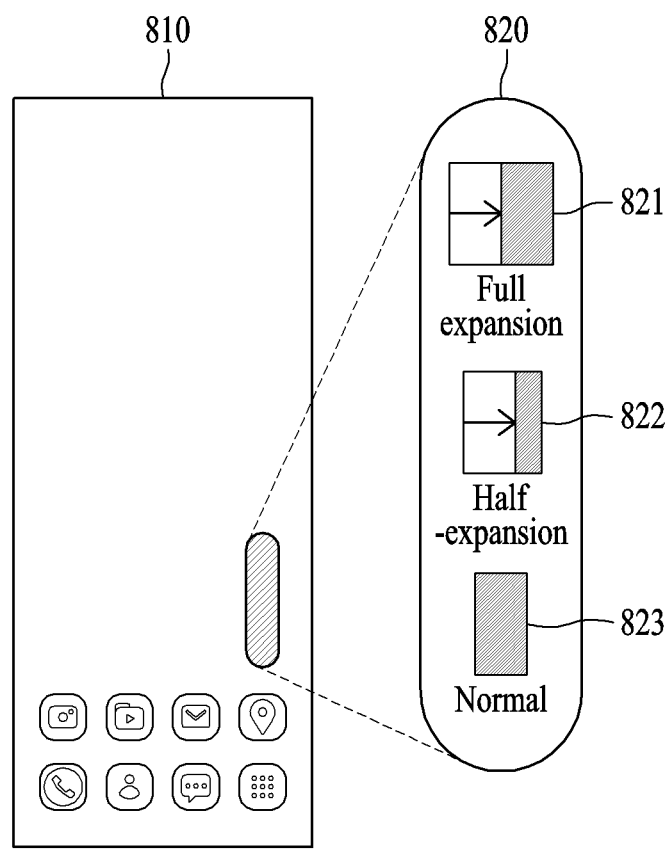
FIGS. 8A, 8B, and 8C illustrate a plurality of affordances that vary according to a current size of an exposed area, according to various example embodiments.
Figure 8B:
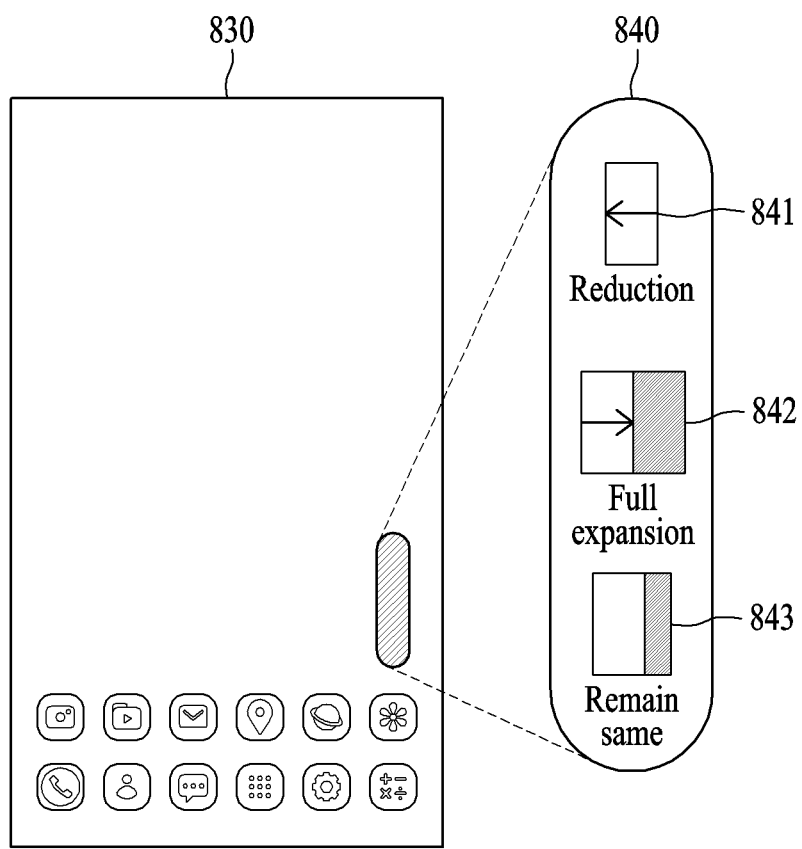
Figure 8C:
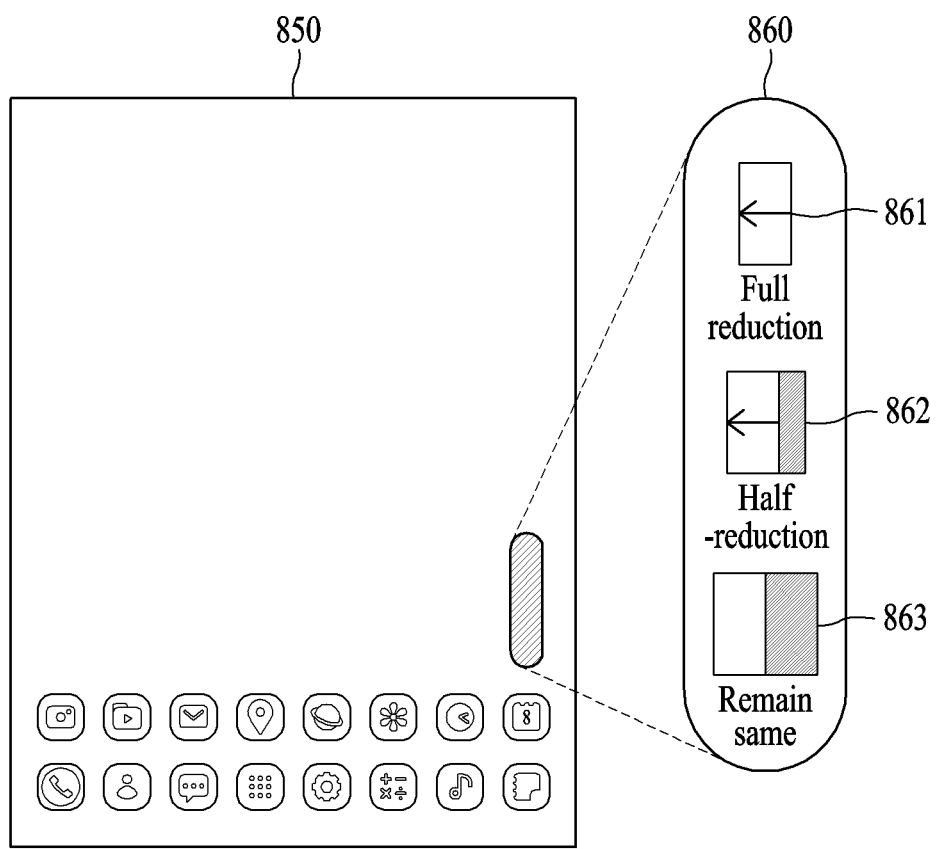

FIGS. 8A-8C illustrate a plurality of affordances that may vary depending on a current size of an exposed area, according to an embodiment.

FIG. 8A illustrates an affordance 820 output when a current size 810 of an exposed area of a flexible display (e.g., the flexible display 330 of FIG. 3) is normal, FIG. 8B illustrates an affordance 840 output when a current size 830 of an exposed area is half-expansion, and FIG. 8C illustrates an affordance 860 output when a current size 850 of an exposed area is full or substantially full expansion.

According to an example embodiment, a graphic element and a text element in each of UI elements included in the affordances 820, 840, or 860 may vary depending on a relationship between a current size and the size corresponding to each of the UI elements. For example, a size may be expanded when the current size, which is the normal, is adjusted to half-expansion but a size may be reduced when the current size, which is full expansion, is adjusted to half-expansion.

In one example with reference to FIG. 8A, the processor may generate a first UI element 821 for full expansion, a second UI element 822 for half-expansion, and a third UI element 823 for normal. Since the current size is normal, the third UI element 823 may not include a right arrow indicating that the exposed area is to be expanded or a left arrow indicating that the exposed area is to be reduced. The first UI element 821 and the second UI element 822 may include the right arrow indicating that the exposed area is to be expanded compared to the current size. Also, the third UI element 823 corresponding to the current size may be disposed at the bottom of the affordance 820, and the first UI element 821 and the second UI element 822 may be disposed in the upper part of the affordance 820. The arrangement of the UI elements 821, 822, and 823 in the affordance 820 may vary depending on an example embodiment.

In one example with respect to FIG. 8B, the processor may generate a first UI element 841 for normal, a second UI element 842 for full expansion, and a third UI element 843 for half-expansion. Since the current size is half-expansion, the third UI element 843 may not include a right arrow indicating that the exposed area is to be expanded or a left arrow indicating that the exposed area is to be reduced. The first UI element 841 may include the left arrow indicating that the exposed area is to be reduced compared to the current size. The second UI element 842 may include the right arrow indicating that the exposed area is to be expanded compared to the current size. In addition, the third UI element 843 corresponding to the current size may be disposed at the bottom of the affordance 840, and the first UI element 841 and the second UI element 842 may be disposed in the upper part of the affordance 840. The arrangement of the UI elements 841, 842, and 843 in the affordance 840 may vary depending on an example embodiment.

In one example with respect to FIG. 8C, the processor may generate a first UI element 861 for normal, a second UI element 862 for half-expansion, and a third UI element 863 for full expansion. Since the current size is full expansion, the third UI element 863 may not include the right arrow indicating that the exposed area is to be expanded or the left arrow indicating that the exposed area is to be reduced. The first UI element 861 and the second UI element 862 may include the left arrow indicating that the exposed area is reduced compared to the current size. In addition, the third UI element 863 corresponding to the current size may be disposed at the bottom of the affordance 860, and the first UI element 861 and the second UI element 862 may be disposed in the upper part of the affordance 860. The arrangement of the UI elements 861, 862, and 863 in the affordance 860 may vary depending on an example embodiment.

Although the affordances including the UI elements indicating the sizes of the exposed area are described with reference to FIGS. 8A to 8C, user settings other than the size of the exposed area may be available for the UI elements.

According to an example embodiment, a UI element of the affordance may indicate an aspect ratio of the exposed area. For example, the aspect ratio of the exposed area may include a normal ratio, a 4:3 ratio, a 16:9 ratio, and a full expansion ratio.

According to an example embodiment, the UI element of the affordance may indicate a specific layout of a screen output in the exposed area. For example, the layout of the screen may include a mobile layout and a tablet layout.

According to an example embodiment, the UI element of the affordance may indicate the number of split screens output in the exposed area. For example, the number of split screens may be 2 to 4.

Figure 9:
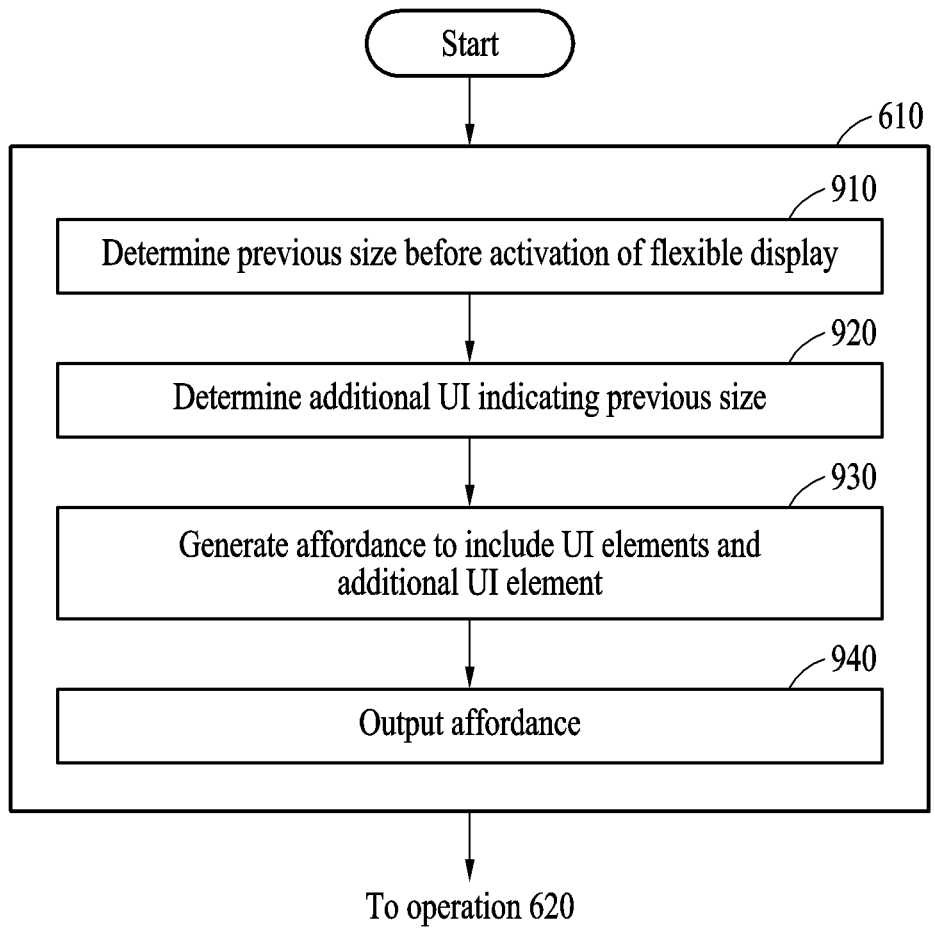
FIG. 9 is a flowchart of a method of outputting an affordance generated based on a previous size of an exposed area before a flexible display is deactivated, according to an example embodiment.

FIG. 9 is a flowchart of a method of outputting an affordance generated based on a previous size of an exposed area before a flexible display is deactivated, according to an example embodiment.

According to an example embodiment, operation 610 described above with reference to FIG. 6 may include operations 910 through 940 to be described hereinafter with reference to FIG. 9.

In operation 910, a processor (e.g., the processor 120 of FIG. 1) of an electronic device (e.g., the electronic device 101 of FIG. 1 or the electronic device 300 of FIG. 3) may determine a previous size before the deactivation of a flexible display (e.g., the display 210 of the display module 160 or the flexible display 330 of FIG. 3). That is, the size of the exposed area at the time of the activation of the flexible display may be determined to be the previous size.

For example, the size of the exposed area when a user presses a screen-off button may be determined to be the previous size. For example, the size of the exposed area when the user locks a system may be determined to be the previous size.

In operation 920, the processor of the electronic device may determine an additional UI element indicating the previous size.

In operation 930, the processor of the electronic device may generate an affordance to include one or more UI elements (e.g., the UI elements 821, 822, and 823 of FIG. 8A, the UI elements 841, 842, and 843 of FIG. 8B, or the UI elements 861, 862, and 863 of FIG. 8C) and an additional UI element. The additional UI element and the affordance including the additional UI element are described in detail hereinafter with reference to FIG. 10.

In operation 940, the processor of the electronic device may output the generated affordance on at least a portion of the exposed area of the flexible display.

Figure 10:
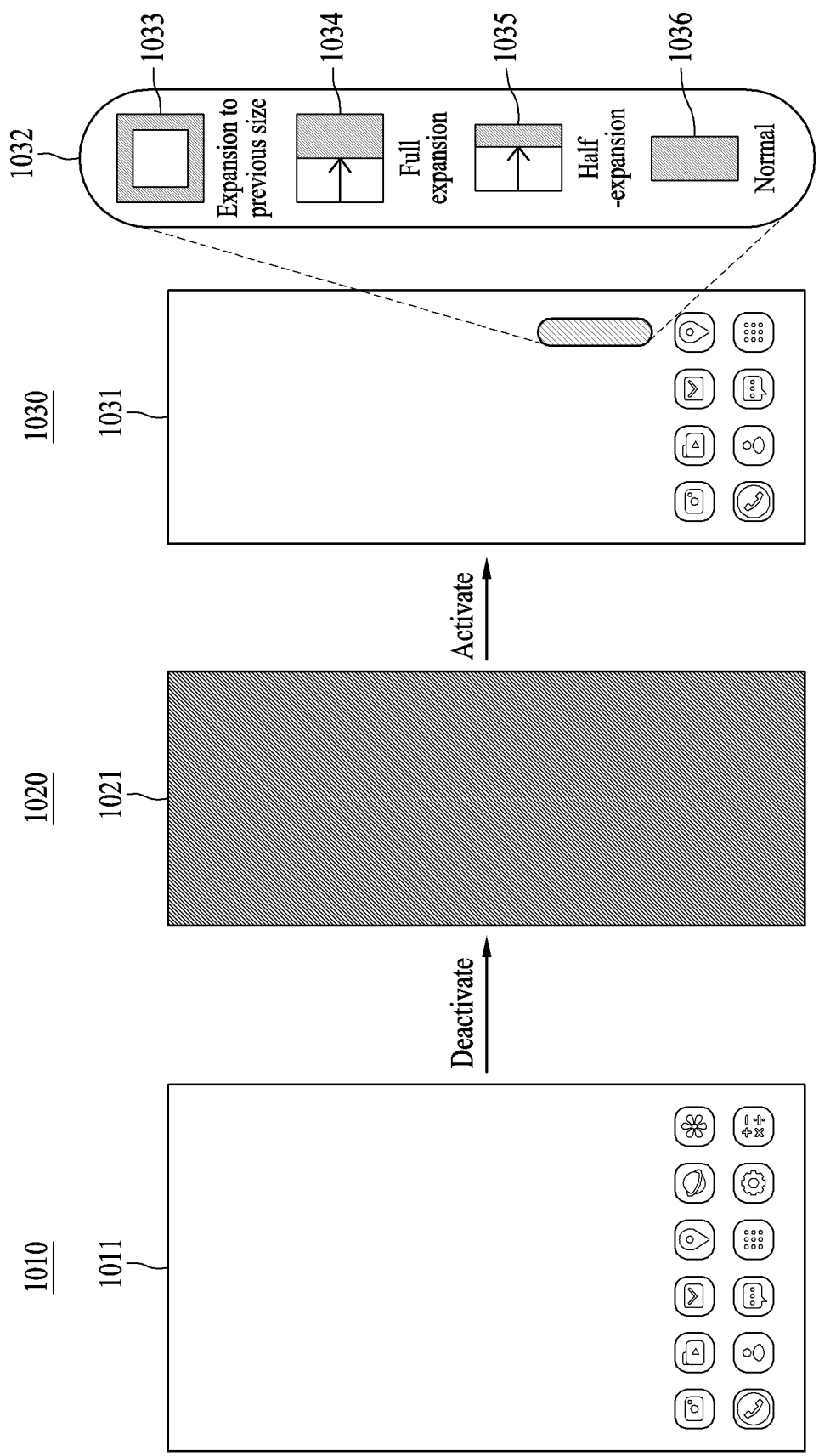
FIG. 10 illustrates an affordance including an additional UI element generated based on a previous size of an exposed area before a flexible display is deactivated, according to an example embodiment.

FIG. 10 illustrates an affordance including an additional UI element generated based on a previous size of an exposed area before the deactivation of a flexible display, according to an example embodiment.

In operation 1010, a size 1011 of the exposed area of a flexible display (e.g., the flexible display 330 of FIG. 3) of an electronic device (e.g., the electronic device 101 of FIG. 1 and the electronic device 300 of FIG. 3) may be half-expanded. Afterwards, for example, a user may press a screen-OFF button to deactivate the flexible display. The size of the exposed area when the flexible display is deactivated may be half-expansion.

In operation 1020, the user may adjust the size of the exposed area in a state in which the flexible display is deactivated. For example, the user may adjust a size 1021 of the exposed area to normal, using a physical force. Afterwards, for example, the user may press a screen-ON button to activate the flexible display.

In operation 1030, the processor of the electronic device may determine a previous size (e.g., half-expansion) before the deactivation of the flexible display and an additional UI element 1033 indicating the previous size. Additionally, the processor may determine a current size 1031 and determine one or more UI elements 1034, 1035, and 1036 based on the current size 1031. The processor may generate an affordance 1032 to include the additional UI element 1033 and the one or more UI elements 1034, 1035, and 1036 and may output the affordance 1032.

Figure 11:
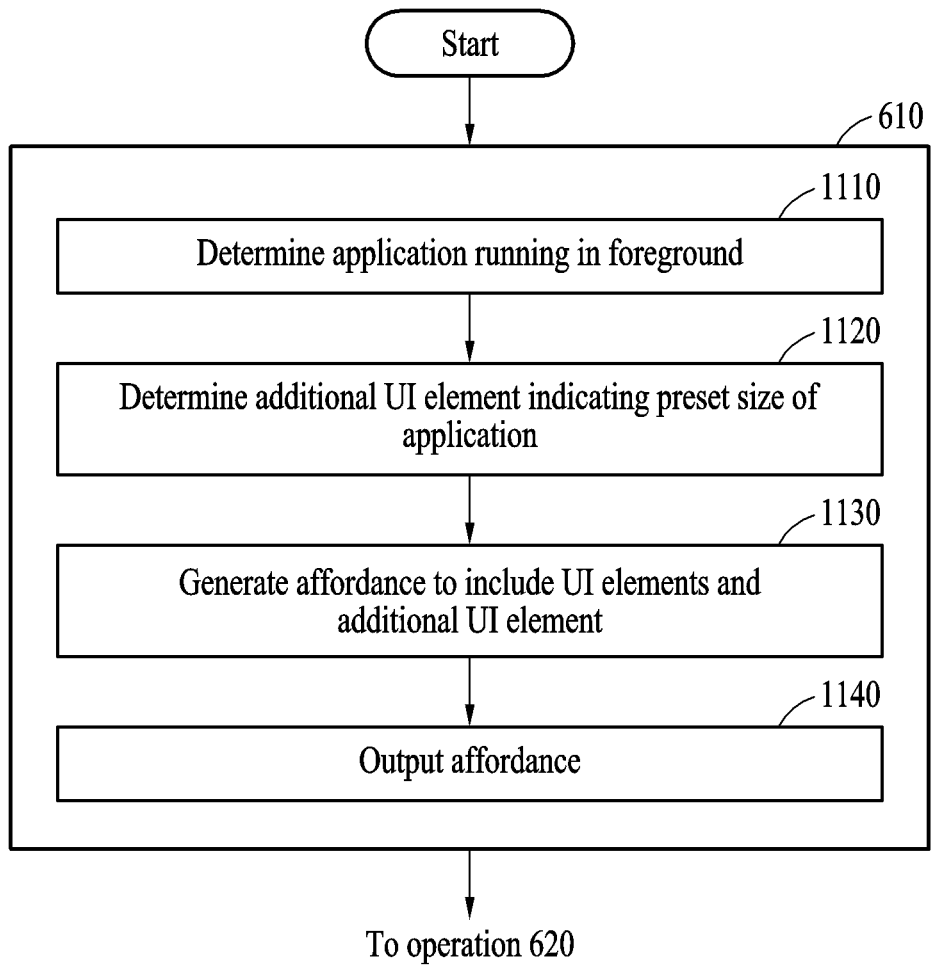
FIG. 11 is a flowchart of a method of outputting an affordance generated based on an application executed in the foreground, according to an example embodiment.

FIG. 11 is a flowchart of a method of outputting an affordance generated based on an application running in the foreground, according to an example embodiment.

According to an example embodiment, operation 610 described above with reference to FIG. 6 may include operations 1110 through 1140 to be described hereinafter with reference to FIG. 11.

In operation 1110, a processor (e.g., the processor 120 of FIG. 1) of an electronic device (e.g., the electronic device 101 of FIG. 1 or the electronic device 300 of FIG. 3) may determine (or identify) an application running in the foreground. For example, an application running in a single window may be determined to be the application running in the foreground. For example, applications being executed in a multi-window may be determined to be the applications being executed in the foreground.

In operation 1120, the processor of the electronic device may determine an additional UI element indicating a size preset for a determined application. For example, a user may preset a size for its corresponding application. For example, the processor may preset a size for a corresponding application based on the history of the size set during the execution of the corresponding application in the foreground.

According to an example embodiment, the additional UI may include an app icon and a text element indicating the corresponding application.

In operation 1130, the processor of the electronic device may generate an affordance to include one or more UI elements (e.g., the UI elements 821, 822, and 823 of FIG. 8A, the UI elements 841, 842, and 843 of FIG. 8B, or the UI element 861, 862, and 863 of FIG. 8C) and an additional UI element.

In operation 1140, the processor of the electronic device may output the generated affordance on at least a portion of the exposed area of the flexible display.

Figure 12:
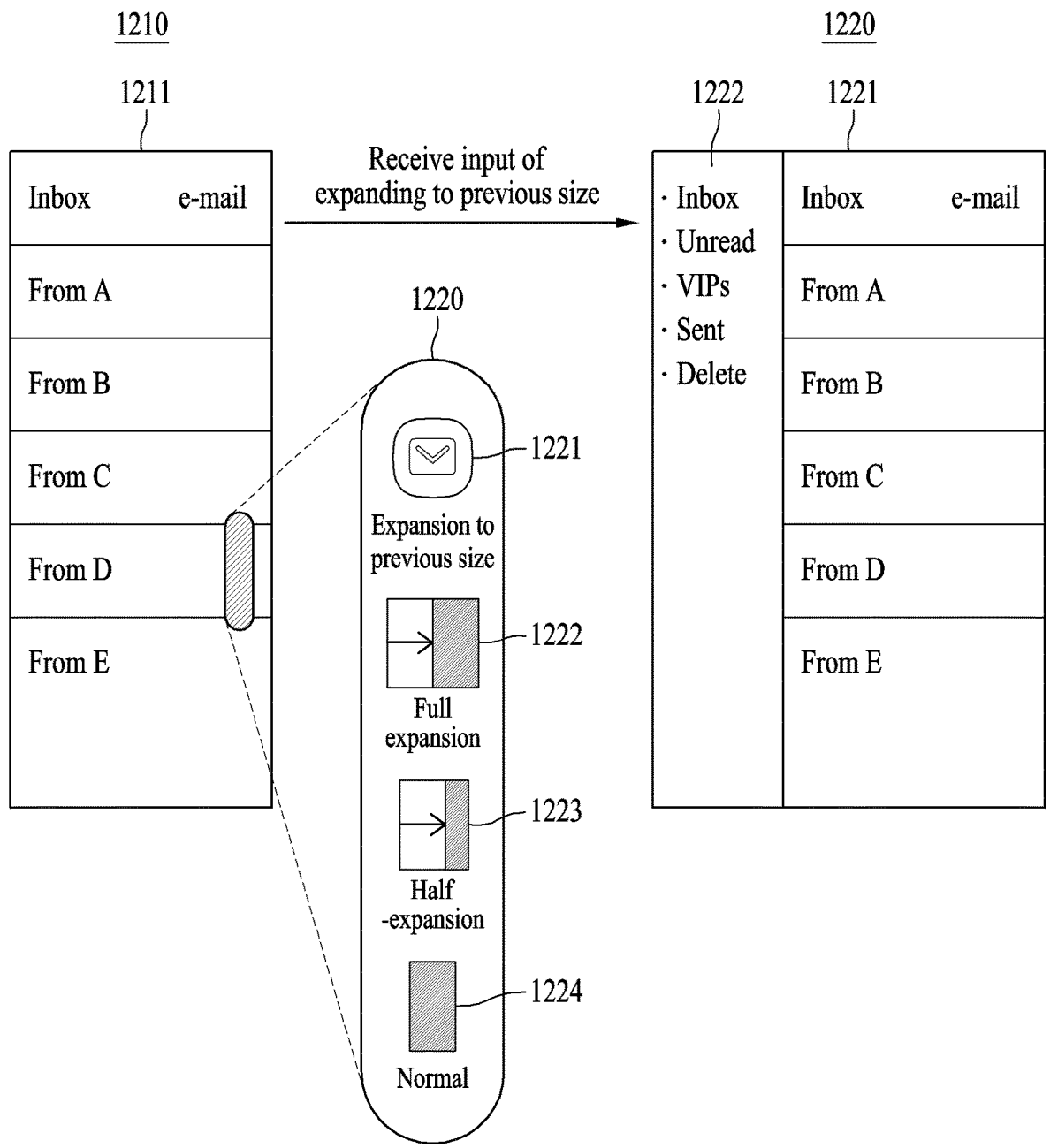
FIG. 12 illustrates an affordance including an additional UI element generated based on an application executed in the foreground, according to an example embodiment.

FIG. 12 illustrates an affordance including an additional UI element generated based on an application running in the foreground, according to an example embodiment.

In operation 1210, a processor (e.g., the processor 120 of FIG. 1) of an electronic device (e.g., the electronic device 101 of FIG. 1 or the electronic device 300 of FIG. 3) may determine an application (e.g., an e-mail application) running in the foreground. Also, the processor may determine a size 1211 (e.g., normal) of an exposed area of a flexible display (e.g., the flexible display 330 of FIG. 3).

The processor may determine an additional UI element 1221 representing a preset size (e.g., half-expansion) of an e-mail application and one or more UI elements 1222, 1223, and 1224, based on the current size, which is the size 1211. The processor may generate and output an affordance 1220 to include the additional UI element 1221 and the one or more UI elements 1222, 1223, and 1224. For example, a user may select the additional UI element 1221 in the affordance 1220.

In operation 1220, the processor may control the flexible display to have the size of the exposed area of the flexible display correspond to the size of the additional UI element 1221 (e.g., half-expansion and/or expansion to a previous size). For example, as the exposed area of the flexible display increases, the email application may further output a new menu 1222. As the exposed area of the flexible display increases, the user may more comfortably and efficiently use the e-mail application.

Figure 13:
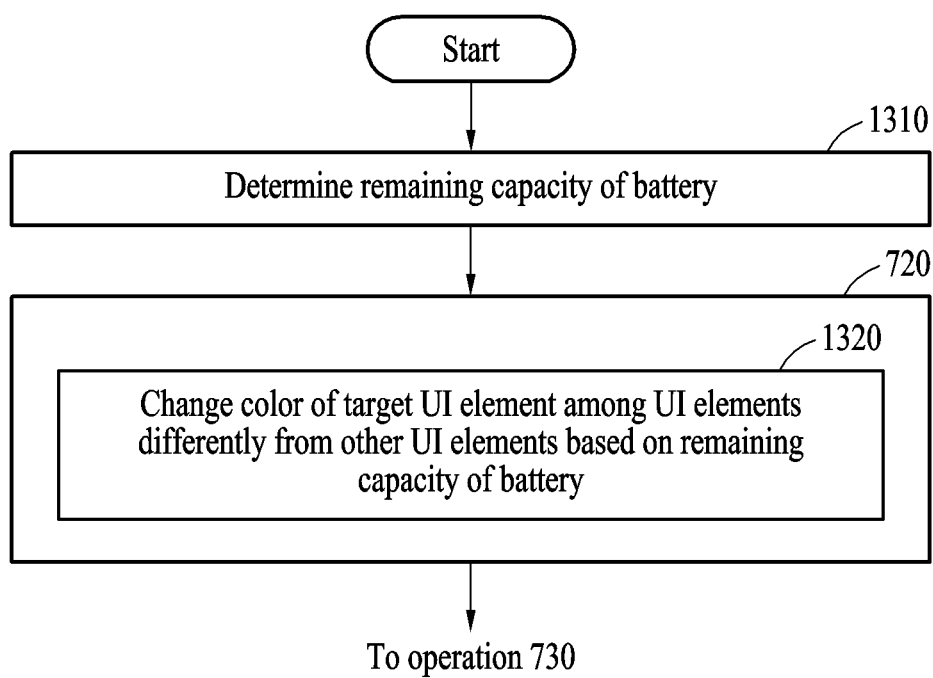
FIG. 13 is a flowchart of a method of changing a color of a target UI element, based on the remaining capacity of a battery, according to an example embodiment.

FIG. 13 is a flowchart of a method of changing a color of a target UI element, based on the remaining capacity of a battery, according to an example embodiment.

According to an example embodiment, operation 1310 described below may be performed before operation 720 described above with reference to FIG. 7. Additionally, operation 720 may include the operation 1320.

In operation 1310, a processor (e.g., the processor 120 of FIG. 1) of an electronic device (e.g., the electronic device 101 of FIG. 1 or the electronic device 300 of FIG. 3) may determine (or identify) the remaining capacity of a battery (e.g., the battery 189 of FIG. 1).

In operation 1320, the processor of the electronic device may change a color of a target IU element differently from other IU elements, based on the remaining capacity of the battery, among one or more UI elements (e.g., the UI elements 821, 822, and 823 of FIG. 8A, the UI elements 841, 842, and 843 of FIG. 8B, or the UI elements 861, 862, and 863 of FIG. 8C). In an example embodiment, the processor may identify state information of the electronic device corresponding to the target UI element and determine the one or more UI elements based on the state information of the electronic device. For example, the processor may determine a target UI element representing a specific size among the one or more UI elements based on the state information (e.g., the remaining capacity of the battery) and may set a color of the determined target UI element differently from the other UI elements.

According to an example embodiment, when the remaining capacity of the battery is less than a preset threshold value (e.g., 5%), the processor may induce a user to keep the size of the flexible display (e.g., the flexible display 330 of FIG. 3) small by displaying colors of the UI elements differently. For example, when the current size is normal, the UI elements indicating expansion may be displayed in red not to recommend to increase the exposed area and the UI elements indicating remaining in the current size may be displayed in green. For example, when the current size is half-expansion or full expansion, the UI element indicating reducing the exposed area may be displayed in green.

In an example embodiment, although the battery (e.g., the remaining capacity of the battery) is described as state information of the electronic device corresponding to one or more UI elements, information other than the battery may be included. For example, the processor may determine an operation state of a driving unit (e.g., a motor), a layout of a screen set by a user (e.g., the mobile layout and the tablet layout) and/or the number of split screens to be state information on the electronic device. For example, two UI elements (e.g., the UI elements 821 and 823 of FIG. 8A) may be determined to be the state information of the layout and three UI elements (e.g., the UI elements 821, 822, and 823 of FIG. 8A) may be determined to be the state information of the split screens. In an example embodiment, the processor may change a color of a target UI element (e.g., a UI element indicating a specific size among one or more UI elements) to be different from other UI elements based on change in the determined state information.

A method of outputting an affordance including one or more UI elements representing each size is described with reference to FIGS. 7 to 13. Described hereinafter with reference to FIGS. 14 to 17 is a method of executing an application and adjusting the size of an exposed area when a flexible display is activated.

Figure 14:
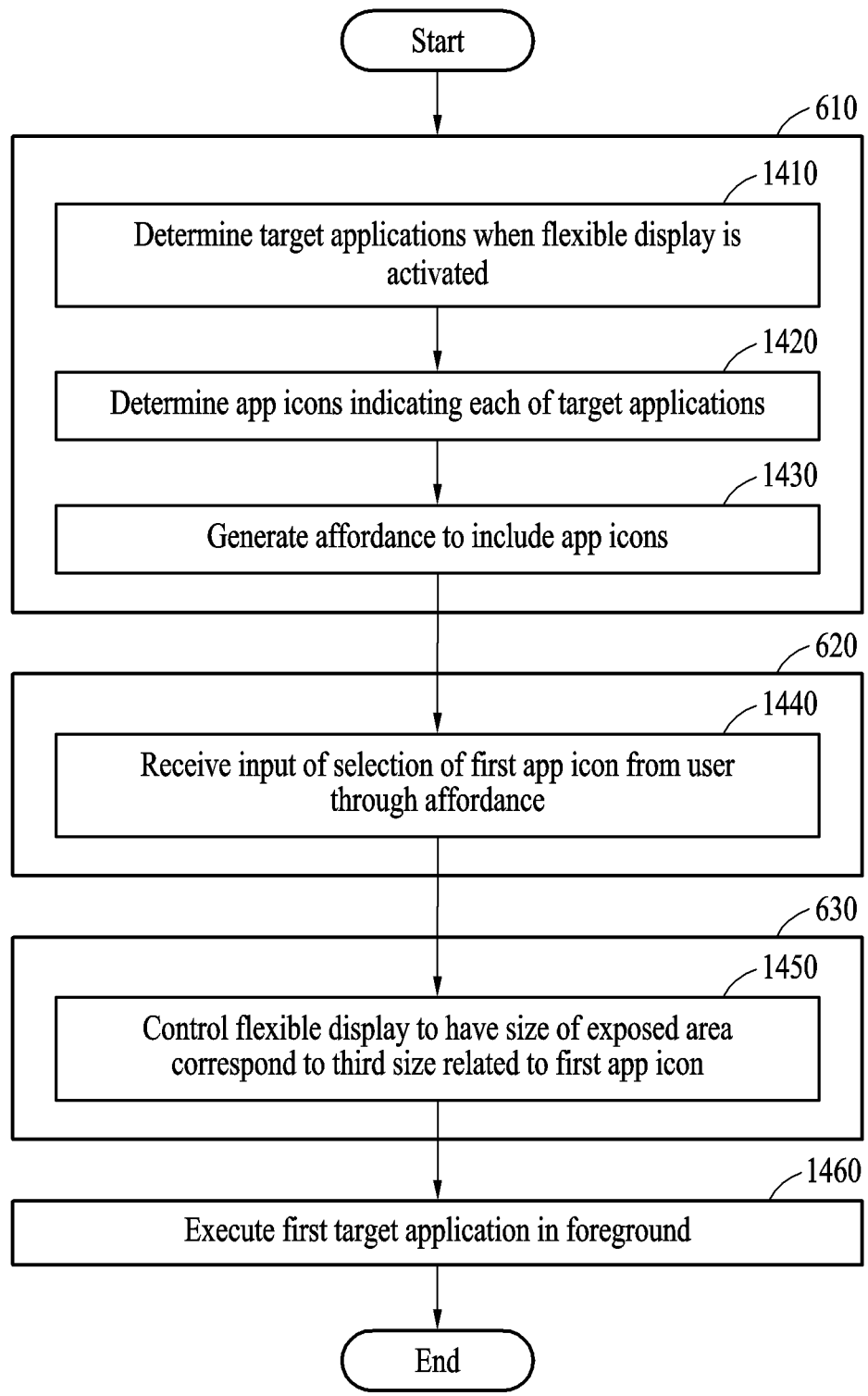
FIG. 14 is a flowchart of a method of outputting an affordance generated based on target applications, controlling a flexible display based on an affordance selection input, and executing an application, according to an example embodiment.

FIG. 14 is a flowchart of a method of outputting an affordance generated based on target applications, controlling a flexible display based on an affordance selection input, and executing an application, according to an example embodiment.

According to an example embodiment, operation 610 described above with reference to FIG. 6 may include operations 1410 to 1430, operation 620 may include operation 1440, and operation 630 may include operation 1450.

In operation 1410, a processor (e.g., the processor 120 of FIG. 1) of an electronic device (e.g., the electronic device 101 of FIG. 1 or the electronic device 300 of FIG. 3) may determine a preset number of target applications when a flexible display (e.g., the flexible display 330) is activated.

For example, an application frequently executed by a user may be determined to be a target application. The application frequently executed by a user may change based on execution history.

For example, an application registered as a shortcut by the user may be determined to be the target application.

For example, an application running in the foreground before the deactivation of the flexible display may be determined to be the target application.

For example, applications executed in the foreground in a multi-window before the deactivation of the flexible display may be determined to be target applications.

In operation 1420, the processor may determine app icons representing each of the target applications. For example, the app icon may be an app tile image or a symbol image of a corresponding application.

In operation 1430, the processor may generate an affordance to include app icons. The affordance including the app icons is described in detail with reference to FIG. 15.

In operation 1440, the processor may receive an input of the selection of a first app icon from the user through the affordance. For example, the user may touch the first app icon indicating a target application that the user intends to execute among output app icons. For example, the selection of the first app icon may be input by dragging the first app icon to a preset target area on the exposed area. The input of the drag selection is described in detail below with reference to FIG. 16.

In operation 1450, the processor may control the flexible display to have the size of the exposed area of the flexible display correspond to a third size associated with the first app icon. For example, the processor may control the flexible display by controlling a driving unit (or driving module).

According to an aspect, the size of the exposed area may be preset for a first application indicated by the first app icon. For example, regarding the first target application, the processor may associate, with the first target application, the third size that the user designates for the first target application in advance. For example, the processor may associate the first target application with the third size in advance, based on the history of the size of the exposed area set during the execution of the first target application in the foreground.

In operation 1460, the processor may execute the first target application in the foreground.

For example, operations 1450 and 1460 may be performed concurrently. For example, any one of operations 1450 and 1460 may be performed first.

Figure 15:
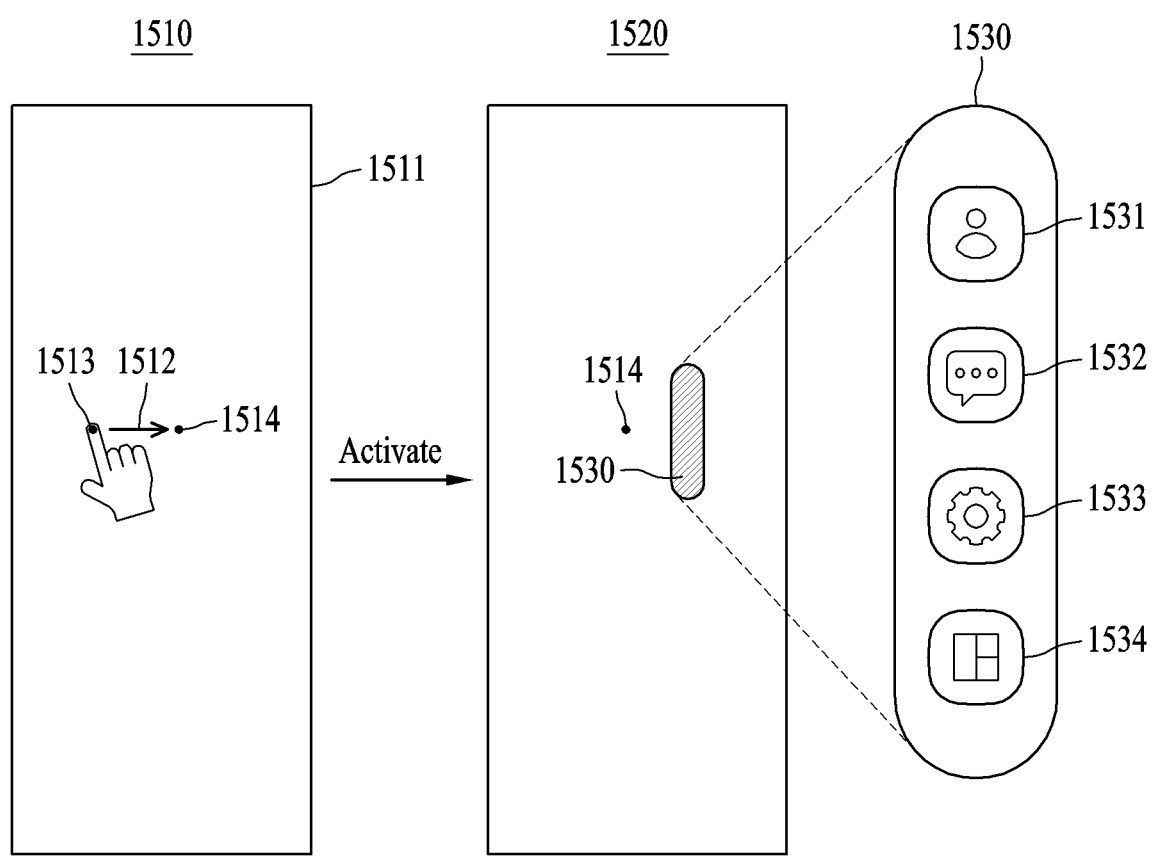
FIG. 15 illustrates an affordance including a plurality of application icons generated based on target applications, according to an example embodiment.

FIG. 15 illustrates an affordance including app icons generated based on target applications, according to an example embodiment.

In operation 1510, a user may perform an input to activate a flexible display (e.g., the flexible display 330) of an electronic device (e.g., the electronic device 101 of FIG. 1 or the electronic device 300 of FIG. 3).

For example, the user's input may be a knock on the flexible display.

For example, the user's input may be a drag input 1512, which is an input of drag a length greater than or equal to a preset length on the flexible display. A processor (e.g., the processor 120 of FIG. 1) of the electronic device may calculate a length of the drag input 1512 from a coordinate 1513 at which a first touch occurs and activate the flexible display in response to the drag input 1512, which drags to the length equal to or greater than the preset length. The drag input 1512 may be held or released at a coordinate 1514.

For example, the user's input may be a pattern drag. When the pattern drag matches a preset encryption pattern, the processor may activate the flexible display.

According to an example embodiment, when the flexible display is activated, the processor may determine a size 1511 of an exposed area.

In operation 1520, when the user's input activates the flexible display, the processor of the electronic device may determine target applications and may determine app icons 1531, 1532, 1533, and 1534 respectively representing the target applications. For example, the app icon 1531 may correspond to a contact information application, the app icon 1532 may correspond to a message application, the app icon 1533 may correspond to a settings application, and the app icon 1534 may correspond to a multi-window application.

According to an example embodiment, the target applications (or the app icons 1531, 1532, 1533, and 1534) may be determined based on the size 1511 determined of the exposed area.

The processor may generate an affordance 1530 to include the app icons 1531, 1532, 1533, and 1534. For example, the processor may determine a coordinate (e.g., coordinate 1514) touched last by the user and output the affordance 1530 near the determined coordinate.

For example, when the user is holding the touch at the coordinate 1514, the user may select an app icon by dragging the touch in the direction of an app icon corresponding to the target application that the user intends to execute.

For example, when the user releases the touch at the coordinate 1514, the user may select an app icon by touching an app icon (e.g., the app icons 1531, 1532, 1533, and 1534) corresponding to the target application the user intends execute.

The processor may control the flexible display to adjust the size of the exposed area to the size associated with the selected app icon. Also, the processor may execute the target application corresponding to the app icon in the foreground. When the app icon 1534 representing the multi-window is selected, the processor may adjust the size of the exposed area to a size supported by the multi-window and execute, in the foreground through the multi-window, the applications that have been executed in the multi-window before the activation of the flexible display.

Figure 16:
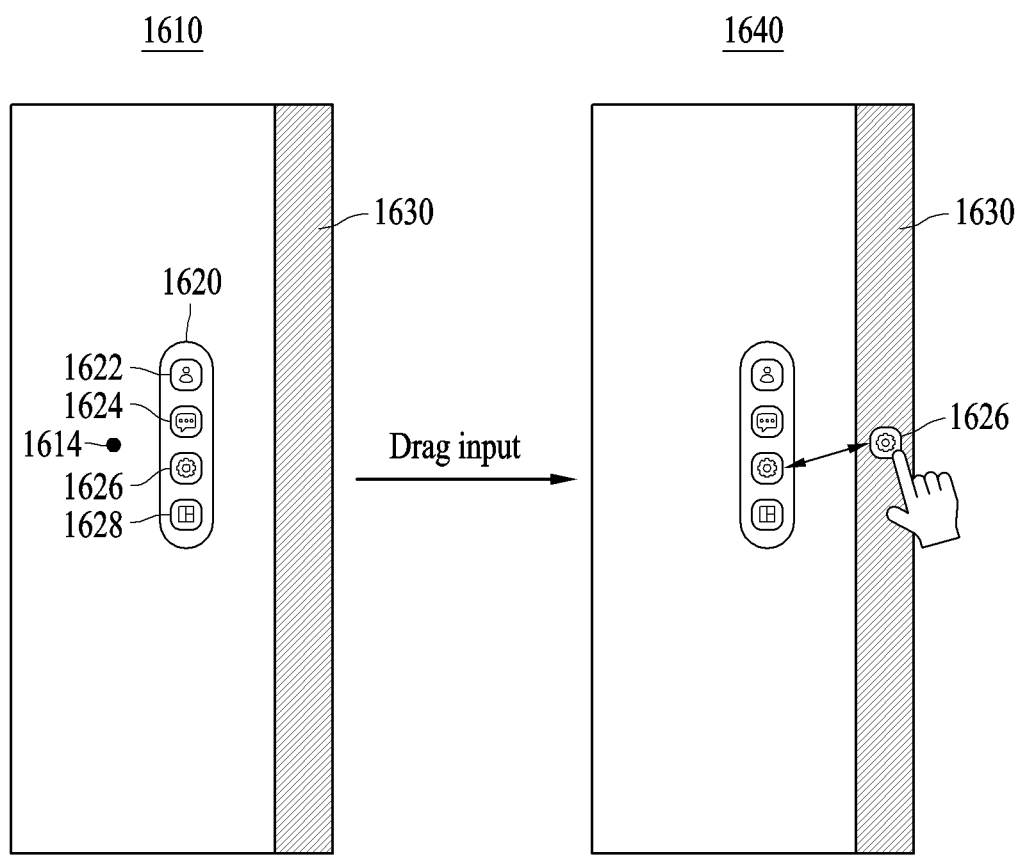
FIG. 16 illustrates a method in which an application icon selected by a user is dragged to a preset target area in an exposed area, according to an example embodiment.

FIG. 16 illustrates a method in which an app icon selected by a user is dragged to a preset target area in an exposed area, according to an example embodiment.

In operation 1610, a processor (e.g., the processor 120 of FIG. 1) of an electronic device (e.g., the electronic device 101 of FIG. 1 or the electronic device 300 of FIG. 3) may output an affordance 1620 including app icons 1622, 1624, 1626, and 1628. For example, the location of the affordance 1620 may be determined based on a coordinate 1614 touched last by a user.

According to an example embodiment, a portion of an exposed area of a flexible display (the flexible display 330) may be preset as a target area 1630. The target area 1630 may be a selection area.

In operation 1640, the user may transmit a selection input to the electronic device by dragging, to the target area 1630, the app icon 1626 of an application that the user intends to execute. For example, when the user's touch is released in a state in which the dragged app icon 1626 is positioned within the target area 1630, the processor may determine that the selection input of the app icon 1626 has been received from the user.

Figure 17:
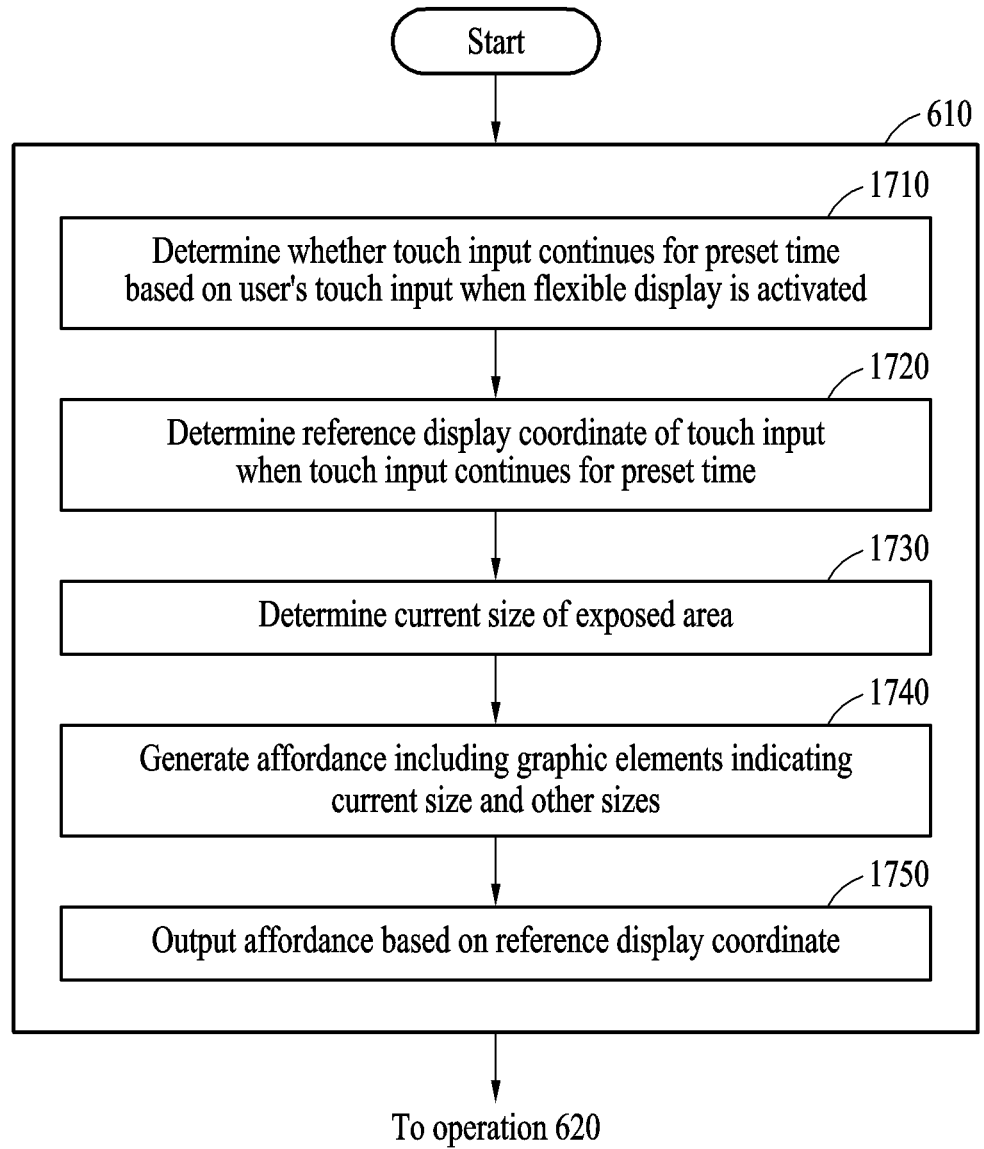
FIG. 17 is a flowchart of a method of outputting an affordance based on a coordinate of a reference display determined based on a user's touch input, according to an example embodiment.

FIG. 17 is a flowchart of a method of outputting an affordance based on a coordinate of a reference display determined based on a user's touch input, according to an example embodiment.

According to an example embodiment, operation 610 described above with reference to FIG. 6 may include operations 1710 through 1750 to be described hereinafter with reference to FIG. 17.

In operation 1710, a processor (e.g., the processor 120 of FIG. 1) of an electronic device (e.g., the electronic device 101 of FIG. 1 or the electronic device 300 of FIG. 3) may determine whether a touch input continues for a preset time based on a user's touch input when a flexible display (e.g., the flexible display 330 of FIG. 3) is activated. The user may maintain a touch input for the preset time even after the activation of the flexible display to transmit, to the electronic device, their intention to adjust the size of the flexible display through the affordance.

In operation 1720, when the touch input continues for the preset time, the processor of the electronic device may determine a reference display coordinate of the touch input. For example, the processor may determine any one coordinate (e.g., the center coordinate) on the touch input is to be the reference display coordinate.

In operation 1730, the processor of the electronic device may determine a current size of the exposed area of the flexible display.

In operation 1740, the processor of the electronic device may generate an affordance including graphic elements representing sizes different from the current size. For example, the graphic elements may be concentric circles with different radii. The affordance including graphic elements is described in detail below with reference to FIGS. 18A and 18B.

In operation 1750, the processor of the electronic device may output the affordance based on the reference display coordinate.

Figure 18A:
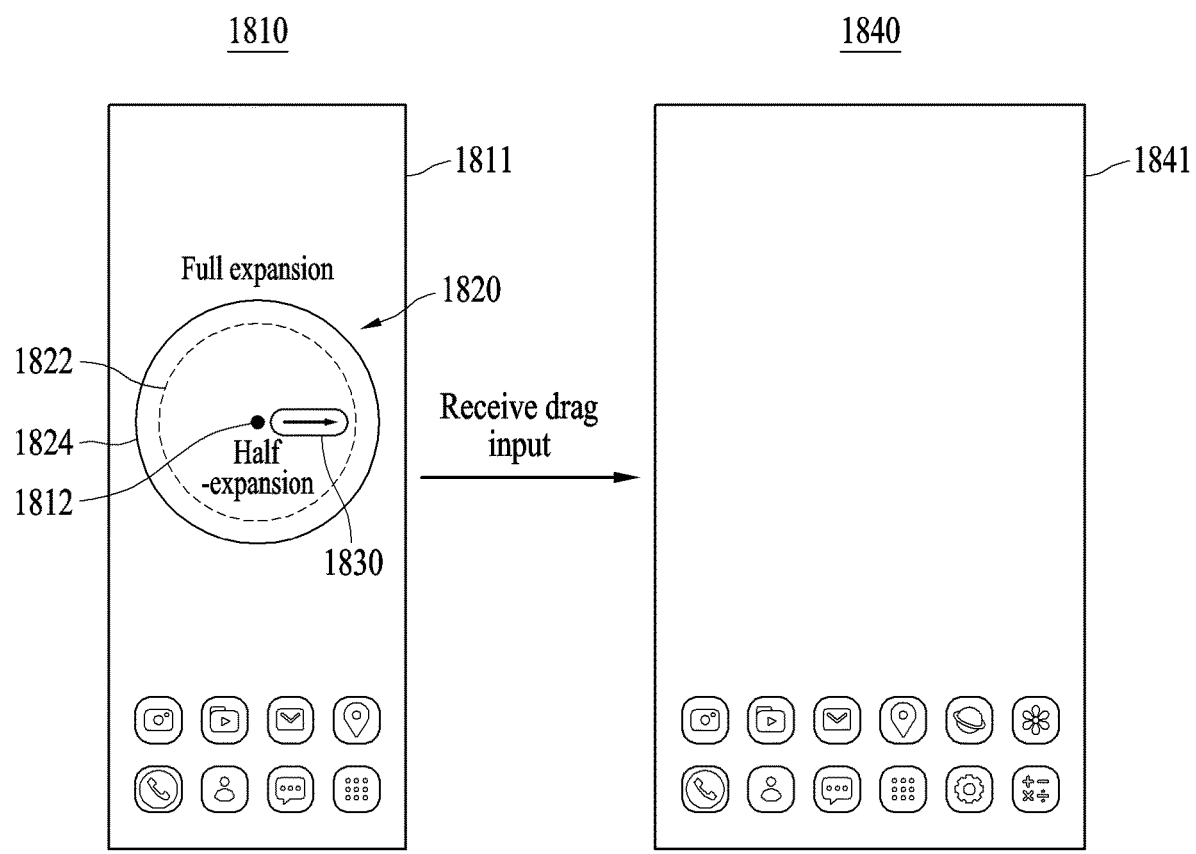
FIGS. 18A and 18B illustrate a method of receiving, from a user, a drag input of an affordance output based on a coordinate of a reference display, according to an example embodiment.
Figure 18B:
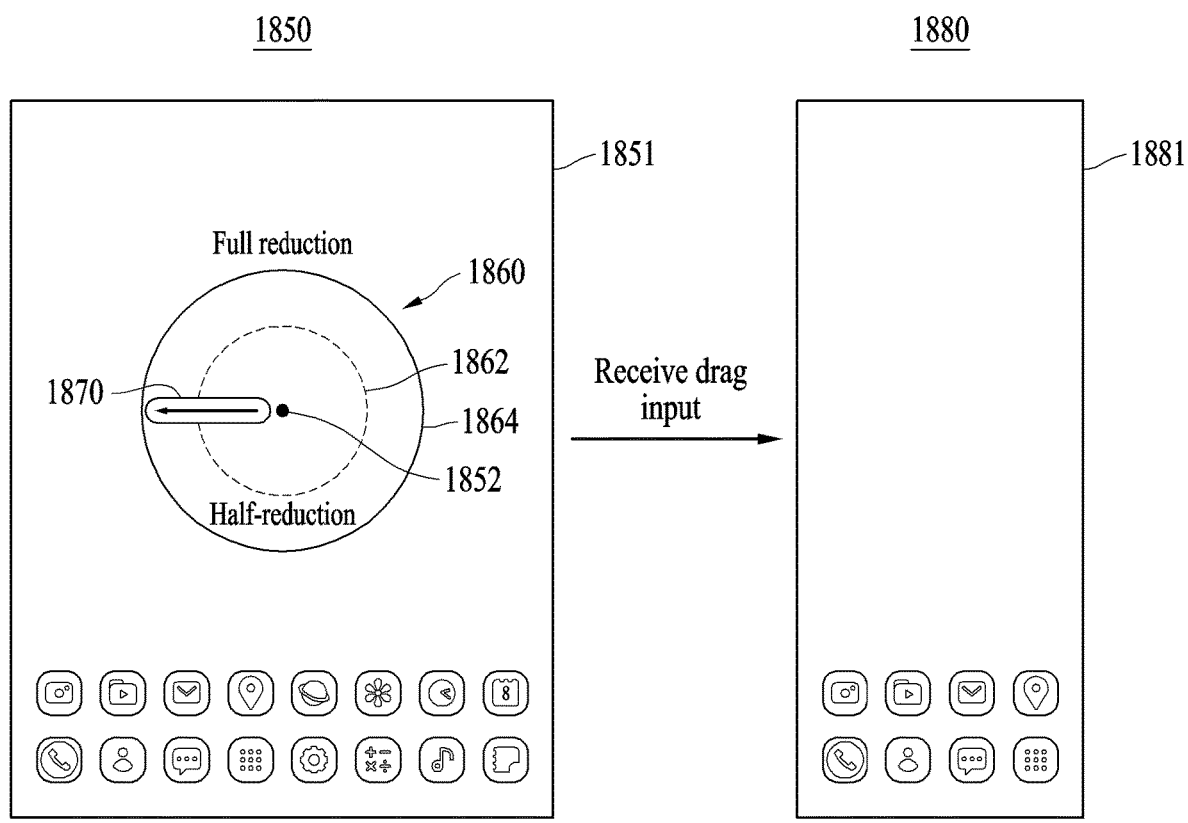

FIGS. 18A and 18B illustrate a method of receiving a drag input from a user with respect to an affordance output based on a reference display coordinate, according to an example embodiment.

FIG. 18A illustrates a case where a current size 1811 of an exposed area of a flexible display (e.g., the flexible display 330 of FIG. 3) of an electronic device (e.g., the electronic device 101 of FIG. 1 or the electronic device 300 of FIG. 3)) is normal.

In operation 1810, a processor (e.g., the processor 120 of FIG. 1) of the electronic device may output an affordance 1820 including graphic elements 1822 and 1824, based on a reference display coordinate 1812 of a touch input.

The graphic elements 1822 and 1824 may be determined based on the current size 1811 of the exposed area of the flexible display. For example, when the current size 1811 of the exposed area is normal, the graphic element 1822 having a relatively smaller radius than the graphic element 1824 may represent half-expansion and the graphic element 1824 having a relatively larger radius than the graphic element 1822 may represent full expansion.

The user may transmit information about a target size to the electronic device by dragging a touch to a graphic element (e.g., the graphic element 1822) corresponding to a desired size of the exposed area from the reference display coordinate 1812, in operation 1830.

Although in an illustrated embodiment the affordance 1820 is described as an affordance including the graphic elements 1822 and 1824 with different radii of concentric circles, according to an example embodiment, the affordance 1820 may include circular graphic elements with respect to the reference display coordinates 1812 and a drag touch may be performed from the reference display coordinate 1812 within the boundary of a graphic element in order to transmit information about a desired target size to the electronic device. The target size may be determined based on a proportion of a drag from the reference display coordinate 1812 to the boundary of the graphic element.

In operation 1840, the processor of the electronic device may determine a target size 1841 of the exposed area corresponding to the drag input and control the flexible display to have the size of the exposed area correspond to the target size 1841.

FIG. 18B illustrates a case where a current size 1851 of an exposed area of the flexible display of the electronic device is full expansion.

In operation 1850, the processor of the electronic device may output an affordance 1860 including graphic elements 1862 and 1864 based on reference display coordinates 1852 of a touch input.

The graphic elements 1862 and 1864 may be determined based on the current size 1851 of the exposed area of the flexible display. For example, when the current size 1851 of the exposed area is full expansion, the graphic element 1862 with a relatively smaller radius may represent half-expansion and the graphic element 1864 with a relatively larger radius may represent normal. A text element of "half reduction" may be output in association with the graphic element 1862 since the size of the exposed area needs to be reduced in half to adjust the size of the exposed area from full expansion to half-expansion. Similarly, a text element of "full reduction" may be output in association with the graphic element 1864 since the size of the exposed area needs to be fully reduced in order to adjust the size of the exposed area from full expansion to normal.

A user may transmit information on a target size to the electronic device by dragging a touch from the reference display coordinates 1852 to a graphic element (e.g., the graphic element 1864) corresponding to the desired size of the exposed area, in operation 1870.

In operation 1880, the processor of the electronic device may determine a target size 1881 of the exposed area corresponding to a drag input 1870 and control the flexible display to have the size of the exposed area correspond to the target size 1881.

Figure 19A:
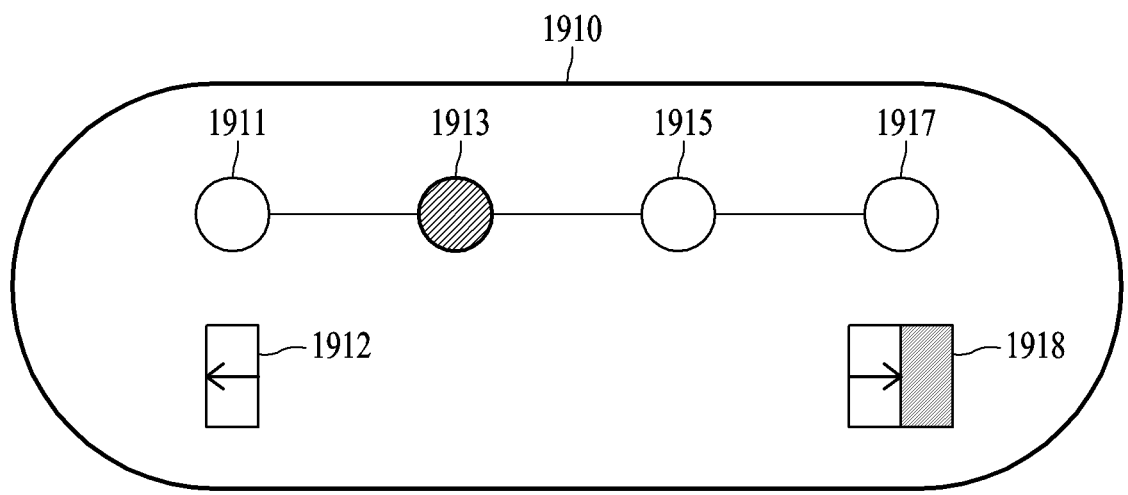
FIGS. 19A, 19B, and 19C illustrate a plurality of affordances according to various example embodiments.
Figure 19B:
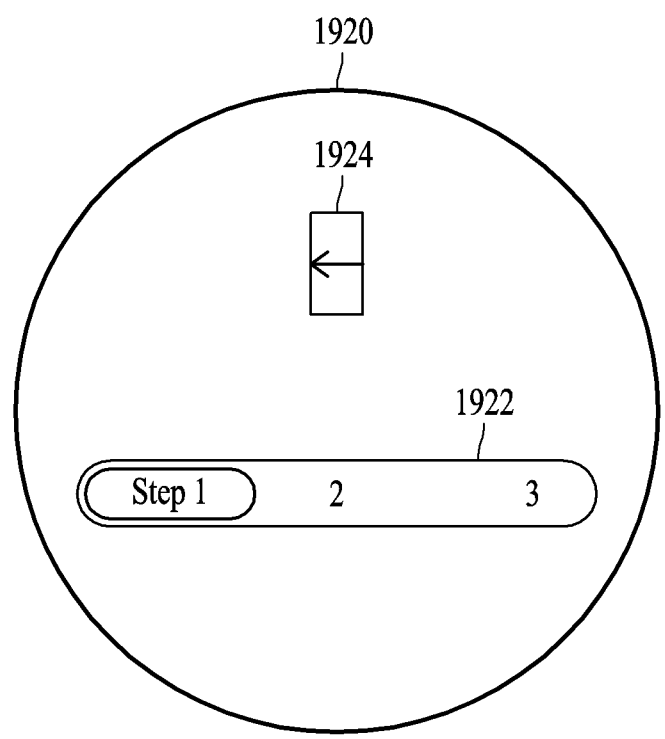
Figure 19C:
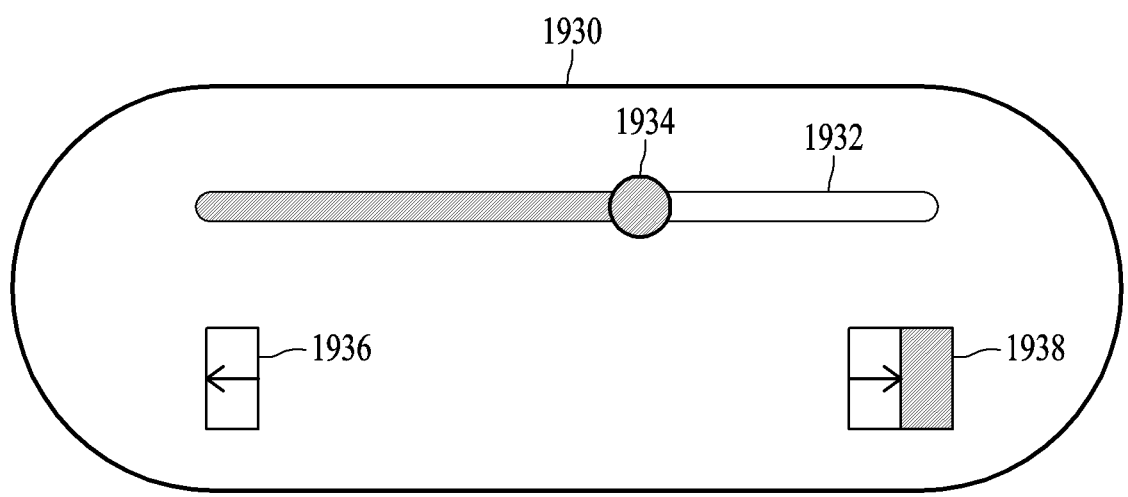

FIGS. 19A, 19B, and 19C illustrate a plurality of affordances according to various embodiments.

FIG. 19A illustrates a diagram illustrating an affordance 1910 representing a plurality of sizes of an exposed area of a flexible display (e.g., the flexible display 330 of FIG. 3) of an electronic device (e.g., the electronic device 101 of FIG. 1 or the electronic device 300 of FIG. 3).

According to an example embodiment, an affordance may include a gauge to control the size of the exposed area of the flexible display. The gauge may include points 1911, 1913, 1915, and 1917, and each of the points 1911, 1913, 1915, and 1917 may indicate a corresponding size of an exposed area. For example, the point 1911 located leftmost in the gauge may indicate the size of normal and the point 1917 located rightmost in the gauge may indicate the size of full expansion. For example, the affordance 1910 may further include graphic effects 1912 and 1918 to visually convey, to a user, the indication that the point 1911 represents normal and that point 1917 represents full expansion. The points 1913 and 1915 located between the points 1911 and 1917 may represent sizes between normal and full expansion. The user may select any one of the points 1911, 1913, 1915, and 1917 to select the size of the exposed area.

FIG. 19B is a diagram illustrating an affordance 1920 representing sizes of an exposed area of a flexible display (e.g., the flexible display 330 of FIG. 3) of an electronic device (e.g., the electronic device 101 of FIG. 1 or the electronic device 300 of FIG. 3).

According to an example embodiment, the affordance 1920 may include a gauge 1922 to control the size of the exposed area of the flexible display. The gauge 1922 may include areas (e.g., Step 1, Step 2, and Step 3), and each of the areas may indicate a corresponding size of the exposed area. For example, the leftmost area (e.g., Step 1) of the gauge 1922 may indicate the size of normal and the rightmost region (e.g., Step 3) of the gauge 1922 may indicate the size of full expansion.

According to an example embodiment, the affordance 1920 may further include a graphic effect 1924 to visually convey, to a user, the size of the exposed area corresponding to a selected area. The graphic effect 1924 may be output differently according to an area selected by the user in the gauge 1922. For example, a graphic effect may be output which corresponds to an area that the user is selecting by a drag touch. The size of the exposed area may be adjusted to a size corresponding to the area, on which the user releases the touch.

FIG. 19C is a diagram illustrating an affordance 1930 representing sizes of an exposed area of a flexible display (e.g., the flexible display 330 of FIG. 3) of an electronic device (e.g., the electronic device 101 of FIG. 1 or the electronic device 300 of FIG. 3).

According to an example embodiment, the affordance 1930 may include a gauge 1932 to control the size of the exposed area of the flexible display. A user may move a point 1934 in the gauge 1932 to input a desired size of the exposed area to the electronic device. For example, the leftmost side of the gauge 1932 may indicate the size of normal and the rightmost side of the gauge 1932 may indicate the size of full expansion. For example, the affordance 1930 may further include graphic effects 1936 and 1938 to visually provide, to the user, the indication that the leftmost side of the gauge 1932 indicates the size of normal and the rightmost side of the gauge 1932 indicates the size of full expansion. The user may move the point 1934 within the gauge 1932 to select the size of the exposed area. For example, the point 1934 may be moved in a free-stop manner, but is not limited to the described embodiment.

Figure 20:
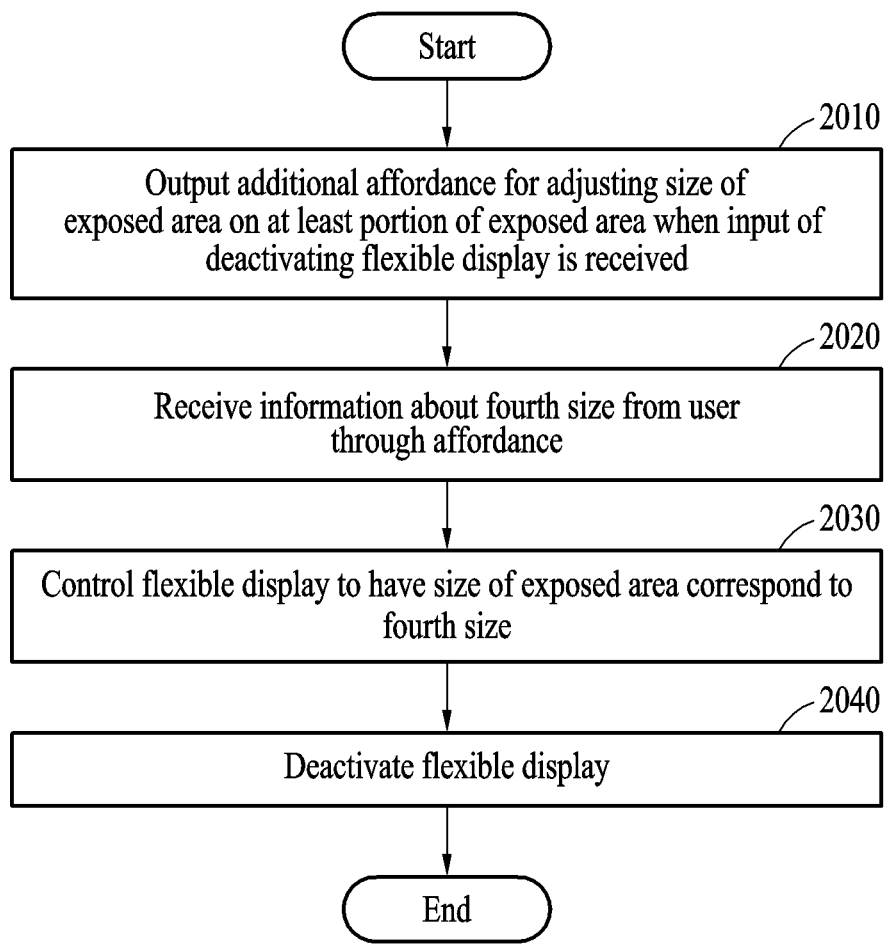
FIG. 20 is a flowchart of a method of outputting an additional affordance when an input of deactivating a flexible display is received and controlling a flexible display based on an additional affordance, according to an example embodiment.

FIG. 20 is a flowchart of a method of outputting an additional affordance when an input of deactivating a flexible display is received and controlling a flexible display based on the additional affordance, according to an example embodiment.

Operations 2010 to 2040 may be performed by an electronic device (e.g., the electronic device 101 of FIG. 1 or the electronic device 300 of FIG. 3). According to an example embodiment, the electronic device may include a processor (e.g., the processor 120 of FIG. 1) and a flexible display (e.g., the display 210 of the display module 160 or the flexible display 330 of FIG. 3).

In operation 2010, in response to receiving an input of deactivating the flexible display, the processor of the electronic device may output an additional affordance, which adjusts the size of an exposed area of the flexible display, on at least a portion of the exposed area.

For example, when a user presses a screen-OFF button, the processor may determine that an input of deactivating the flexible display is received.

For example, the additional affordance may include one or more UI elements representing each size. The additional affordance may include a UI element indicating the minimum or a small size of the exposed area.

In operation 2020, the processor of the electronic device may receive information about a fourth size from the user through the additional affordance. For example, when the user touches a target UI element of the additional affordance, the processor may determine a second target size indicated by the target UI element.

In operation 2030, the processor of the electronic device may control the flexible display to have the size of the exposed area correspond to the fourth size. For example, the processor may control a driving unit (or a driving module) to control the flexible display. Each "module" here may comprise circuitry.

In operation 2040, the processor of the electronic device may deactivate the flexible display.

According to an example embodiment, operations 2010 through 2040 may be performed after operation 640 described with reference to FIG. 6 is performed.

FIG. 21 illustrates a method of outputting an additional affordance when an input of deactivating the flexible display is received and controlling the flexible display based on the additional affordance, according to various embodiments.

In operation 2110, a size 2111 of an exposed area of a flexible display (e.g., the flexible display 330 of FIG. 3) of an electronic device (e.g., the electronic device 101 of FIG. 1 and the electronic device 300 of FIG. 3) may be half-expansion. Thereafter, for example, a user may press a screen-OFF button to transfer a deactivation input to the electronic device.

In operation 2120, a processor (e.g., the processor 120 of FIG. 1) of the electronic device may generate and output an additional affordance 2122 to adjust the size of the exposed area. For example, the additional affordance 2122 may include one or more UI elements 2123. The UI element 2123 may be associated with normal.

According to an example embodiment, the processor may blur or darken the screen of the exposed area and brighten only a portion in which the additional affordance 2122 is output, in response to an input of deactivating the flexible display.

The user may touch the UI element 2123 of the additional affordance 2122 to input information about the fourth size to the electronic device.

In operation 2130, the processor of the electronic device may control the flexible display to have the size of the exposed area correspond to a second target size 2131 and then deactivate the flexible display. Contrary to the above, the processor of the electronic device may deactivate the flexible display and then control the flexible display to have the size of the exposed area correspond to the second target size 2131.

According to an example embodiment, an electronic device (e.g., the electronic device 101 of FIG. 1 or the electronic device 300 of FIG. 3) may include a driving module, a flexible display (e.g., the flexible display of FIG. 3) having a variable size of an exposed area viewed externally on one side as at least a portion of the flexible display is drawn out from the inside of the electronic device by driving of the driving module (comprising a motor and/or circuitry), at least one memory (e.g., the memory 130 of FIG. 1) configured to store executable instructions, and a at least one processor (e.g., the processor of FIG. 1) configured to be operatively connected, directly or indirectly, to the driving module, the flexible display, and the at least one memory and control the electronic device. The at least one processor may be configured by executing the instructions to identify a first size of the exposed area, output, on at least a portion of the exposed area, an affordance (e.g., the affordance 520 of FIG. 5, the affordance 820 of FIG. 8A, the affordance 840 of FIG. 8B, the affordance 860 of FIG. 8C, the affordance 1032 of FIG. 10, the affordance 1220 of FIG. 12, the affordance 1530 of FIG. 15, the affordance 1620 of FIG. 16, the affordance 1820 of FIG. 18A, the affordance 1860 of FIG. 18B, the affordance 1910 of FIG. 19A, the affordance 1920 of FIG. 19B, or the affordance 1930 of FIG. 19C) including at least one selectable UI element configured to change the size of the exposed area based on the identified first size, and when a UI element is selected from among the at least one UI element, control the driving module to change the size of the exposed area from the first size to a second size corresponding to a selected UI element.

According to an example embodiment, the processor may be configured by executing the instruction to determine at least one selectable UI element representing at least one size, based on the identified first size and generate the affordance to include the at least one determined UI element.

According to an example embodiment, an arrangement of the at least one UI element in the affordance may vary depending on the identified first size.

According to an example embodiment, the processor may be configured by executing the instructions to determine a previous size before the deactivation of the flexible display, determine an additional UI element indicating the previous size, and generate the affordance to include at the least one UI element and the additional UI element.

According to an example embodiment, the processor may be configured by executing the instructions to identify an application being executed in the foreground, determine an additional UI element indicating a preset size for the application, and generate an affordance to include the at least one UI element and the additional UI element.

According to an example embodiment, the electronic device may further include a battery (e.g., the battery 189 of FIG. 1) configured to supply power to the electronic device, and the processor may be configured by executing the instructions to identify the remaining capacity of the battery and change a color of a selected UI element differently from other UI elements among the at least one UI element.

According to an example embodiment, the processor may be configured by executing the instructions to suspend an output of the affordance when a user's input to the affordance is not received within a preset time.

According to an example embodiment, the processor may be configured by executing the instructions to determine that the flexible display is active when the electronic device is unlocked and identify the first size of the exposed area when the flexible display is activated.

According to an example embodiment, the processor may be configured by executing the instructions to determine that the flexible display is active when an input of activating the deactivated electronic device is received and may identify the first size of the exposed area when the flexible display is activated.

According to an example embodiment, the processor may be configured by executing the instructions to determine a preset number of target applications when the flexible display is activated and determine a plurality of app icons respectively representing the target applications, wherein a first app icon of the plurality of app icons is associated with a third size preset for the first target application, may generate the affordance to include the plurality of the app icons, may control the driving module to have the size of the exposed area correspond to the third size when an input of the selection of the first app icon is received based on the affordance, and execute the first target application in the foreground.

According to an example embodiment, the preset number of target applications may be applications executed in the foreground of the electronic device in a multi-window before the deactivation of the flexible display.

According to an example embodiment, the processor is configured by executing the instructions to generate the affordances to include the plurality of app icons and an additional icon representing the multi-window, control the flexible display to have the size of the exposed area correspond to the size of the multi-window when the input of the selection of the additional icon is received through the affordance, and execute the target applications in the foreground through the multi-window.

According to an example embodiment, the processor may be configured by executing the instructions to preset a third size of the first target application based on history of the size of the exposed area set during the execution of the first target application in the foreground.

According to an example embodiment, the input of the selection of the first app icon may be an input of dragging the first app icon to a preset target area in the exposed area.

According to an example embodiment, the processor may be configured by executing the instructions to determine whether the touch input continues for a preset time when the flexible display is activated based on a user's touch input, determine a reference display coordinate of the touch input when the touch input continues for the preset time, determine the first size of the exposed area, generate the affordance including graphic elements representing sizes different from the first size, and output the affordance based on the reference display coordinate. "Based on" as used herein covers based at least on.

According to an example embodiment, the processor may be configured by executing the instructions to receive a drag input indicating the second size from the user through the affordance.

According to an example embodiment, the processor may be configured by executing the instructions to output an additional affordance for adjusting the size of the exposed area of at least a portion of the exposed area, when an input of deactivating the flexible display is received, control the driving module to change the size of the exposed area to a fourth size corresponding to the input to the additional affordance, and deactivate the flexible display.

According to an example embodiment, a method performed by an electronic device (e.g., the electronic device 101 of FIG. 1 or the electronic device 300 of FIG. 3) may include, when a flexible display (e.g., the flexible display 330 of FIG. 3) has a variable size of an exposed area viewed externally on one side as at least a portion of the flexible display is drawn out from the inside of the electronic device and the flexible display is activated, outputting, on at least a portion of the exposed area, an affordance for adjusting the size of the exposed area (e.g., the affordance 520 of FIG. 5, the affordance 820 of FIG. 8A, the affordance 840 of FIG. 8B, the affordance 860 of FIG. 8C, the affordance 1032 of FIG. 10, the affordance 1220 of FIG. 12, the affordance 1530 of FIG. 15, the affordance 1620 of FIG. 16, the affordance 1820 of FIG. 18A, the affordance 1860 of FIG. 18B, the affordance 1910 of FIG. 19A, the affordance 1920 of FIG. 19B, or the affordance 1930 of FIG. 19C) (e.g., operation 610 of FIG. 6), identifying a target size of the exposed area, based on an input to the affordance (e.g., operation 620 of FIG. 6), and controlling a driving module (comprising a motor and/or circuitry) configured to move the flexible display to have the size of the exposed area correspond to the target size (e.g., operation 630 of FIG. 6).

According to an example embodiment, an electronic device (e.g., the electronic device 101 of FIG. 1 or the electronic device 300 of FIG. 3) may include a flexible display (e.g., the flexible display 330 of FIG. 3) having a variable size of an exposed area viewed externally on one side as at least a portion of the flexible display is drawn out from the inside of the electronic device, at least one memory (e.g., the memory 130 of FIG. 1) configured to store executable instructions, and at least one processor (e.g., the processor 120 of FIG. 1) configured to control the electronic device. The processor may be configured to output, on at least a portion of an exposed area, an additional affordance (e.g., the affordance 2122 of FIG. 21) configured to adjust the size of the exposed area when an input of deactivating the flexible display is received, receive information on the size of a second target based on the additional affordance, control the flexible display to have the size of the exposed area correspond to the size of the second target, and deactivate the flexible display.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Therefore, other implementations, other embodiments, and equivalents to the claims are also within the scope of the following claims.

What is claimed is:

1. An electronic device comprising:
    a driving module including a motor and/or circuitry;
    a flexible display configured to vary a size of an exposed area viewable externally as at least a portion of the flexible display is drawn out from an inside of the electronic device at least by driving of the driving module;
    memory storing executable instructions; and
    at least one processor comprising processing circuitry,
    wherein the instructions, when executed by the at least one processor individually or collectively, cause the electronic device to:
    identify a first size of the exposed area of the flexible display;
    control to output an affordance on at least a portion of the exposed area, wherein the affordance includes at least one selectable user interface (UI) element designed to change the size of the exposed area, wherein the at least one selectable UI element is determined based on the identified first size; and
    control the driving module to change the size of the exposed area from the first size to a second size corresponding to the selected UI element based on selection of a UI element from among the at least one UI element.

2. The electronic device of claim 1, wherein the instructions, when executed by the at least one processor individually or collectively, cause the electronic device to:
    determine the at least one selectable UI element representing at least one size, based on the identified first size; and
    generate the affordance to include the at least one UI element.

3. The electronic device of claim 2, wherein an arrangement of the at least one UI element in the affordance is to vary based on the identified first size.

4. The electronic device of claim 2, wherein the instructions, when executed by the at least one processor individually or collectively, cause the electronic device to:
    determine a previous size before a deactivation of the flexible display;

determine an additional UI element indicating the previous size; and
generate the affordance to include the at least one UI element and the additional UI element.

5. The electronic device of claim 2, wherein the instructions, when executed by the at least one processor individually or collectively, cause the electronic device to:
identify an application being executed in a foreground;
determine an additional UI element indicating a preset size for the application; and
generate the affordance to include the at least one UI element and the additional UI element.

6. The electronic device of claim 1, further comprising:
a battery configured to supply power to the electronic device, and
wherein the instructions, when executed by the at least one processor individually or collectively, cause the electronic device to:
identify a remaining capacity of the battery; and
change a color of a selected UI element differently from other UI elements among the at least one UI element, based on the remaining capacity of the battery.

7. The electronic device of claim 1, wherein the instructions, when executed by the at least one processor individually or collectively, cause the electronic device to suspend an output of the affordance based on a user's input to the affordance not being received within a preset time.

8. The electronic device of claim 1, wherein the instructions, when executed by the at least one processor individually or collectively, cause the electronic device to:
determine that the flexible display is activated based on the electronic device being unlocked; and
identify the first size of the exposed area based on the flexible display being activated.

9. The electronic device of claim 1, wherein the instructions, when executed by the at least one processor individually or collectively, cause the electronic device to:
determine that the flexible display is activated based on an input of activating the deactivated electronic device being received; and
identify the first size of the exposed area based on the flexible display being activated.

10. The electronic device of claim 1, wherein the instructions, when executed by the at least one processor individually or collectively, cause the electronic device to:
determine a preset number of target applications based on the flexible display being activated;
determine a plurality of app icons respectively representing the target applications, wherein a first app icon of the plurality of app icons is associated with a third size preset for a first target application;
generate the affordance to include the plurality of the app icons;
control the driving module to have the size of the exposed area correspond to the third size when an input of the selection of the first app icon is received based on the affordance; and
execute the first target application in a foreground.

11. The electronic device of claim 10, wherein the preset number of the target applications are applications executed in the foreground of the electronic device in a multi-window before the deactivation of the flexible display.

12. The electronic device of claim 11, wherein the instructions, when executed by the at least one processor individually or collectively, cause the electronic device to:
generate the affordance to include the plurality of app icons and an additional icon representing the multi-window;
control the flexible display to have the size of the exposed area correspond to the size of the multi-window when the input of the selection of the additional icon is received through the affordance; and
execute the target applications in the foreground through the multi-window.

13. The electronic device of claim 10, wherein the instructions, when executed by the at least one processor individually or collectively, cause the electronic device to preset a third size of the first target application, based on history of the size of the exposed area set during the execution of the first target application in the foreground.

14. The electronic device of claim 13, wherein the input of the selection of the first app icon is an input of dragging the first app icon to a preset target area in the exposed area.

15. The electronic device of claim 1, wherein the instructions, when executed by the at least one processor individually or collectively, cause the electronic device to:
determine whether a touch input of a user continues for a preset time when the flexible display is activated based on the touch input of the user;
determine a reference display coordinate of the touch input when the touch input continues for the preset time;
determine the first size of the exposed area;
generate the affordance including graphic elements representing sizes different from the first size; and
control to output the affordance based on the reference display coordinate.

16. The electronic device of claim 15, wherein the instructions, when executed by the at least one processor individually or collectively, cause the electronic device to receive a drag input indicating the second size from the user through the affordance.

17. The electronic device of claim 1, wherein the instructions, when executed by the at least one processor individually or collectively, cause the electronic device to:
output an additional affordance for adjusting the size of the exposed area of at least a portion of the exposed area when an input of deactivating the flexible display is received;
control the driving module to change the size of the exposed area to a fourth size corresponding to the input to the additional affordance; and
deactivate the flexible display.

18. A method performed by an electronic device comprising a flexible display with a variable size of an exposed area viewable externally on one side as at least a portion of the flexible display is drawn out from an inside of the electronic device and the flexible display is activated, the method comprising:
identifying a first size of the exposed area of the flexible display;
outputting an affordance on at least a portion of the exposed area of the flexible display, wherein the affordance includes at least one selectable UI elements indicating each of variable sizes of the exposed area, wherein the at least one selectable UI element is determined based on the identified first size;
identifying a target size of the exposed area, based on an input to the affordance; and
controlling a driver configured to move the flexible display to have the size of the exposed area correspond to the target size.

19. A non-transitory computer-readable storage medium storing instructions that when executed by a processor, cause the processor to perform the method of claim 18.

\* \* \* \* \*